(12) United States Patent
Shaham et al.

(10) Patent No.: US 10,049,542 B2
(45) Date of Patent: Aug. 14, 2018

(54) SELF-PROPELLED SECURITY SYSTEM ON AN ADJACENT TO A FENCE TRACK

(71) Applicant: MAGAL SECURITY SYSTEMS LTD., Yahud (IL)

(72) Inventors: Avi Shaham, Herzliya (IL); Yehonatan Ben-Hamozeg, Rosh Ha'Ayin (IL); Avraham Saar, Holon (IL)

(73) Assignee: Magal Security Systems Ltd., Yahud (IL)

( * ) Notice: Subject to any disclaimer, the term of this patent is extended or adjusted under 35 U.S.C. 154(b) by 461 days.

(21) Appl. No.: 14/703,458

(22) Filed: May 4, 2015

(65) Prior Publication Data
US 2016/0210830 A1 Jul. 21, 2016

Related U.S. Application Data

(63) Continuation-in-part of application No. PCT/IL2013/050895, filed on Nov. 3, 2013.

(30) Foreign Application Priority Data

Nov. 4, 2012 (IL) .......................................... 222842
Sep. 1, 2014 (IL) .......................................... 234403

(51) Int. Cl.
| | |
|---|---|
| *G08B 13/196* | (2006.01) |
| *G08B 25/08* | (2006.01) |
| *H04N 5/28* | (2006.01) |
| *E04H 17/02* | (2006.01) |

(52) U.S. Cl.
CPC . *G08B 13/19621* (2013.01); *G08B 13/19623* (2013.01); *G08B 25/08* (2013.01); *E04H 17/02* (2013.01); *H04N 5/28* (2013.01)

(58) Field of Classification Search
CPC ........... G06K 9/00711; G06K 9/00771; G08B 13/1961; G08B 13/19645; G08B 13/19663; G08B 13/19669; H04N 19/463; H04N 5/232; G11B 27/28
See application file for complete search history.

(56) References Cited

U.S. PATENT DOCUMENTS

| | | | |
|---|---|---|---|
| 5,225,863 A | 7/1993 | Weir-Jones | |
| 5,327,233 A * | 7/1994 | Choi | ................ G08B 13/19623 348/119 |
| 6,614,468 B1 | 9/2003 | Nordmann | |
| 7,671,890 B2 | 3/2010 | Wentworth | |
| 2002/0008180 A1 | 1/2002 | Nicolette | |

(Continued)

FOREIGN PATENT DOCUMENTS

| | | |
|---|---|---|
| CN | 102063746 | 5/2011 |
| EP | 1447781 | 8/2004 |

(Continued)

*Primary Examiner* — Anner N Holder
(74) *Attorney, Agent, or Firm* — Rodney J. Fuller; Booth Udall Fuller, PLC

(57) ABSTRACT

A self-propelled security system on an adjacent to a fence track, equipped with at least one imaging sensor and wherein the rail track on which the system's movable payload is propelled and the movable payload are both exposed to the fence side, and an anchoring means for anchoring, from time to time, the movable payload, and replacing the payload's battery with a new one within the anchoring means.

11 Claims, 24 Drawing Sheets

(56) References Cited

U.S. PATENT DOCUMENTS

Figure 1:
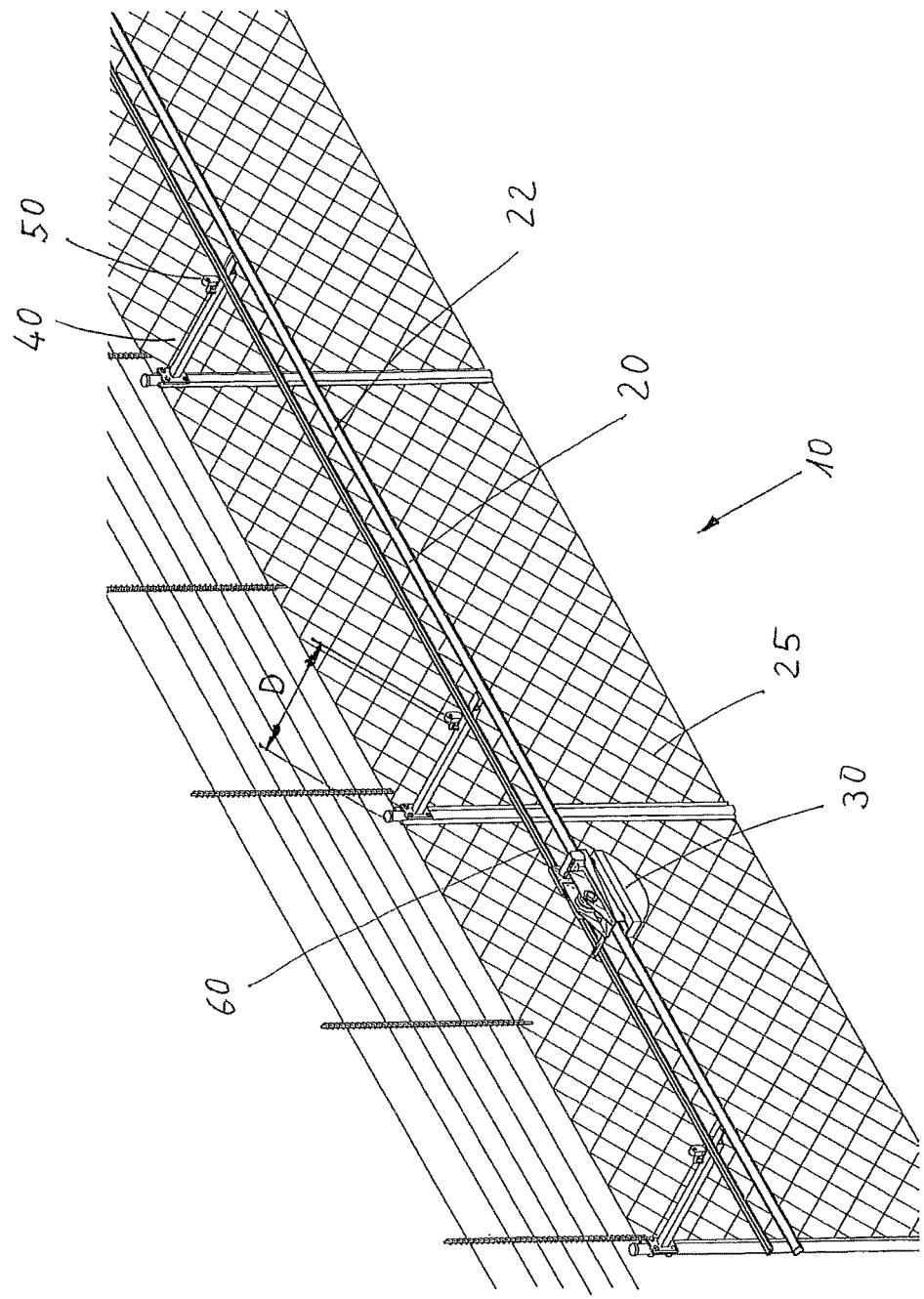

| | | | | |
|---|---|---|---|---|
| 2004/0131231 A1* | 7/2004 | Smilansky | ......... | G06K 9/00778 |
| | | | | 382/103 |
| 2006/0038678 A1 | 2/2006 | Avneri | | |
| 2009/0195654 A1* | 8/2009 | Connell, II | ........ | G06K 9/00771 |
| | | | | 348/154 |
| 2009/0316304 A1 | 12/2009 | Funayama | | |
| 2011/0139923 A1 | 6/2011 | Papanikolopoulos | | |
| 2012/0075467 A1* | 3/2012 | Lee | ......... | G06T 7/246 |
| | | | | 348/143 |
| 2014/0339374 A1* | 11/2014 | Mian | ......... | G08G 1/0175 |
| | | | | 246/473.1 |

FOREIGN PATENT DOCUMENTS

| | | |
|---|---|---|
| IL | 188349 | 4/2011 |
| WO | 0169930 | 9/2001 |
| WO | 2009147663 | 12/2009 |
| WO | 2012023137 | 2/2012 |

* cited by examiner

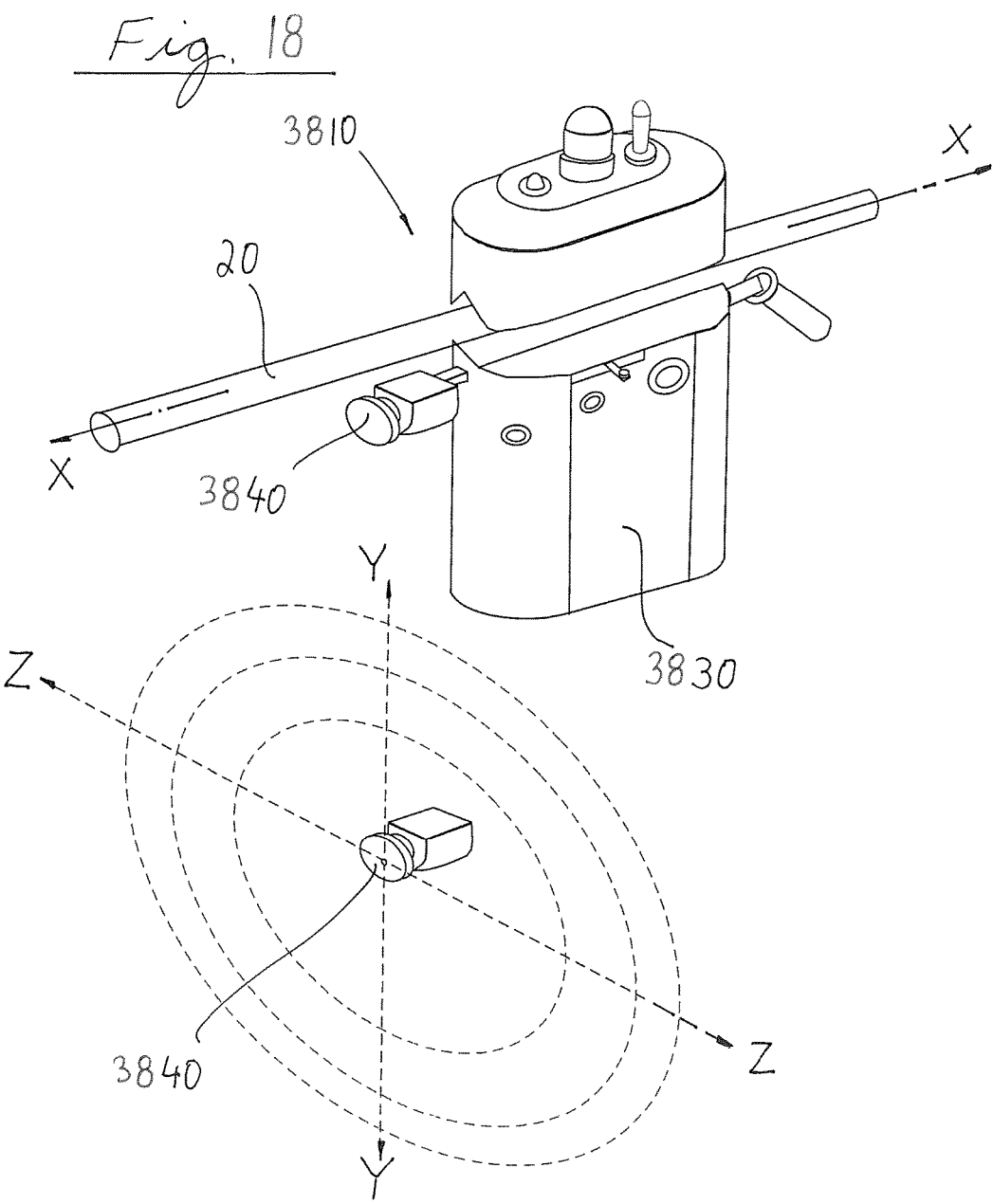

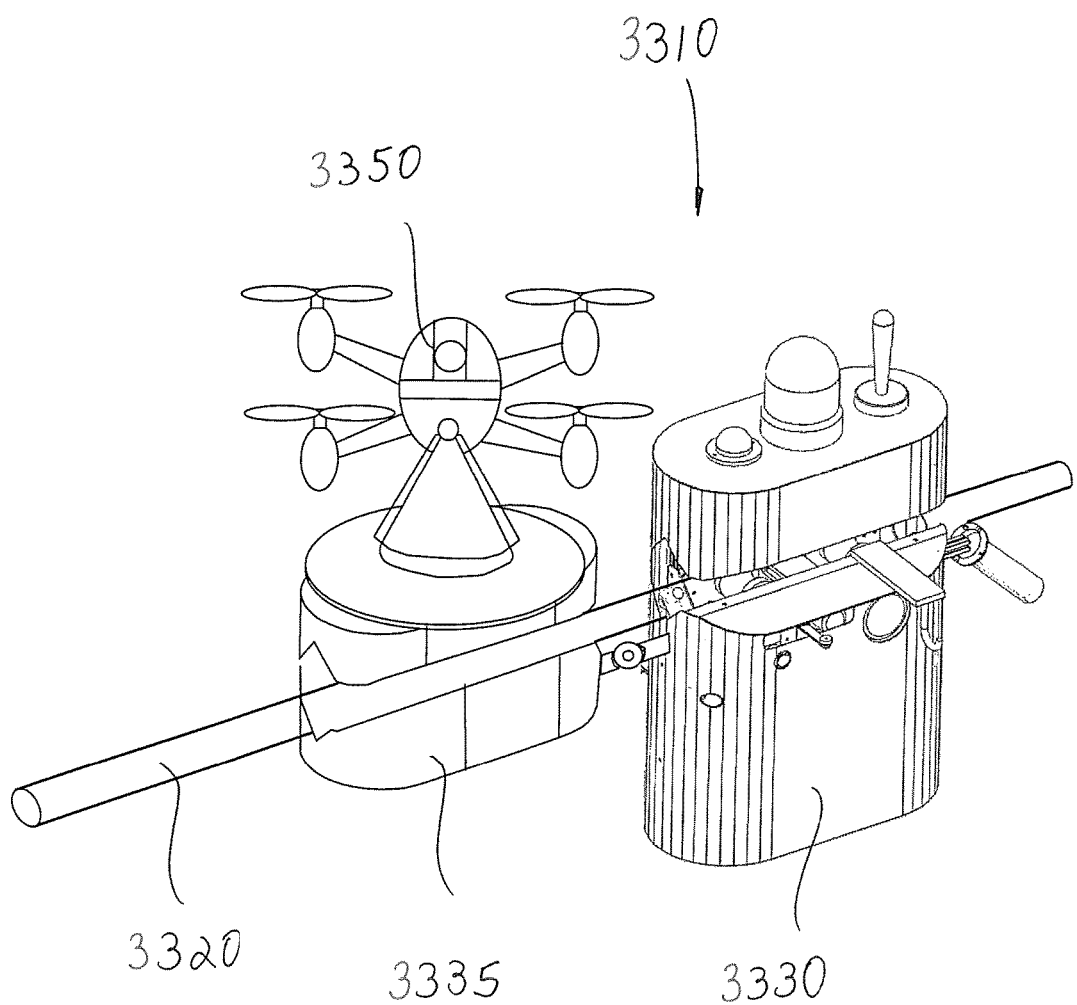

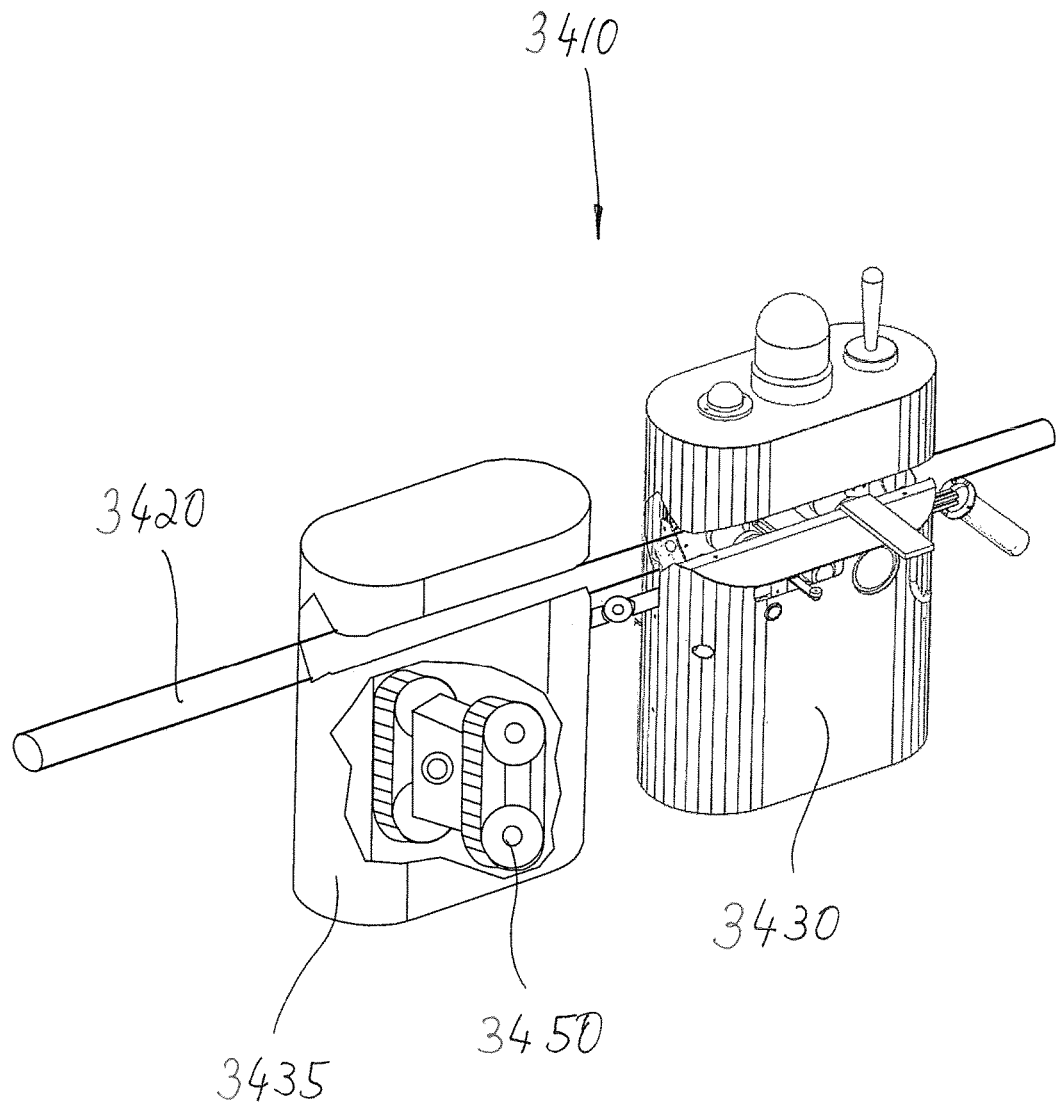

SELF-PROPELLED SECURITY SYSTEM ON AN ADJACENT TO A FENCE TRACK

CROSS-REFERENCE TO RELATED APPLICATION

This application is a continuation-in-part of International Application No. PCT/IL2013/050895, filed Nov. 3, 2013, which claims the benefit of and priority to Israeli Patent Application No. 222842, filed Nov. 4, 2012; this application also claims the benefit of and priority to Israeli Patent Application No. 234403, filed Sep. 1, 2014; the contents of each application are incorporated herein in their entireties.

FIELD OF THE INVENTION

The invention, the subject matter of this patent application, is found in the field of security systems for detecting intrusions (penetrations) that include a fence in general, and in the field of means serving to monitor security fences as said in particular.

BACKGROUND OF THE INVENTION

A fence is a common means in the field of security systems and a wide scope, routine use of them prevails, for example along a border or separation lines and around sensitive sites that require circumferential sector protection (airports, ports, infrastructure installations and so on).

Warning fences for detecting intrusions include—usually, infrastructures in the form of an array (assemblage) of anchoring poles and sensors' poles that are deployed along the fences, wherein they are pinned (stuck) in the ground and rise perpendicular to it. A flat fence surface in a multi wires or net configuration is connected to the poles' array and it also extends perpendicular (orthogonally) to the ground surface.

Locating an intrusion through the fence as said and issuing an appropriate warning, dictates not only the installation of sensors as said, but also fast arrival at the site of the intrusion along the fence, and at least referring an imaging means towards the intrusion's location (site) in order to verify that surely it is an intrusion that occurred and not a false alarm. In other words—intrusion detection fences require patrolling (scanning) that would be amenable for quick launching along its length and/or deployment of an array of observation sensors along its length.

Verily, there is a snag, as patrolling along the fence raises high costs and also exposes its personnel to being attacked. Also operating un-manned vehicles for carrying out such patrolling missions along the length of the fence is relatively expensive and prone to problems of exact remote control and driving accuracies.

Concurrently, deployment of observation sensors along the fence's length was also found to be relatively expensive and exposed to being damaged as a static system, for example by snipers, and remote neutralizing, requires existence of a line of sight along the various sectors (namely sensitive to the existence of "dead areas" along the fence periphery, limited to specific observation angels and sensitive under certain non favorable weather conditions—rain, fog, dust). A fixed system of observation sensors has also a difficulty in providing a "close view" of the fence and its near-by surrounding sectors, as required for exact analysis of the warning (for example—a near (close) view of the warning's reason as required for locating a cut in the fence, a near (close) view as required for evaluating the foot marks (impressions) that were impressed in a brushed earth (dirt) track for detecting intrusions that was paved alongside the fence). In addition, a fixed array of observation sensors does not enable detecting threats by scanning and close observation along the fence (for example—detecting roadside bombs (e.g., an improvised explosive device (IED)) that was laid down near the fence, or a hidden ladder that was prepared in advance for climbing later over the fence).

U.S. Pat. No. 7,671,890 described a "Roving Camera Security System". The subject matter of this patent discloses a multi cameras security system that is propelled on a monorail track wherein it is covered all the time by a housing that covers both the mobile system and the monorail track on which it moves and wherein the housing includes protection from the sun radiation (to prevent the mobile system over heating by the sun radiation) and a filtering window to hide the exact position of the mobile system along the monorail track from an unwanted outside view.

The system described therein, dictates installing a dedicated infrastructure (a housing that covers the entire track along its total length), and does not provide an answer to existing infrastructures of intrusion detection fences, but rather by way of erecting a new infrastructure of fully covered rail and a housing along it. In addition, the mobile system payload there is summarized by a plurality of cameras and does not provide for any other mobile means.

Thus, in the period that preceded the present invention, which is the subject matter of this application, there existed a need for a close threats observation capability while moving along a fence and a rather quick launch of at least unmanned imaging means towards the precise location wherein a warning was received along the intrusion detection fence, and positioning this imaging means in a close proximity to it, and this without having to resort to a solution that requires the construction of a specific dedicated infrastructure that is complicated and relatively expensive in parallel to the fence and separated from it.

SUMMARY OF THE INVENTION

The invention, the subject matter of this patent application, answers the cited above need by implementing a fence coupled security system that includes a rail track means that extends at a height above the ground, alongside the fence and in parallel to it, and a payload means that is connected to the rail track means wherein in it is suited to move along its length and that it includes at least one imaging sensor that from the instant of installing the payload on the track it is turned towards the fence.

A security system in accordance with the invention is characterized by that the rail track means includes an exposed rail that is anchored to the existing fence poles while protruding from them in distance from the fence plain (that is connected to the fence's poles), and spreads substantially in parallel to the fence plain, and in that that the payload means is autonomic in its movements over the exposed track and also exposed by itself to the fence.

In a preferred embodiment of the security system, the fence is an existing intrusion detection fence comprising an array of poles that are stuck in the ground along its length and the rail track means of the system is supported by supporting means that link the track to the already existing poles of the fence (the fence poles that already exist from an earlier time (instance)).

In a different or additional preferred embodiment of the security system, marking means are located along the track means and from the instant that the moveable payload means passes—they enable reading the data (information) that is found on them by a reader means that is installed on the payload means.

In yet another different or additional preferred embodiment of the security system the rail track means of the system comprises means for anchoring the moveable payload of the system from time to time. At least one means for time to time anchoring is located along the track's length and connecting the system to an electricity power supply (e.g.— for reloading of the moveable payload internal battery or replacing it with a fresh one), and to a remote command and control transmissions through it.

In another, or different, or additional preferred embodiment of the security system, the mobile payload means comprises also a system of image processing of the images received from its imaging sensor, for automatic localization of known and defined in advance images that are categorized as indications of intrusion through the fence occurrences (for example—an image of a rip in the fence, an image of footprints in the brushed earth (dirt) track adjacent to the fence, or other threats (such as an image of a roadside bomb)).

In addition to at least one imaging means, a mobile payload in a system in accordance with the invention might also be equipped, in addition, with at least one remotely operated means from a group of feasible means that comprise—audio means for listening and announcing (public address systems), firing means, non lethal weapon means, illuminating means and electronic countermeasure means (e.g.—means for blocking remotely sent signals for detonating a roadside bomb).

As per additional aspect of the invention, in the dedicated payload that is propelled on a track that is mounted adjacent alongside the fence, there is installed a bi-dimensional laser radar system (LIDAR) for providing mapping on three axes, and this is used while exploiting the motion of the payload that in any case exists alongside the track for the sake of the needed third axis.

In an additional aspect of the invention, in the propelled payload on the track that stretches alongside the fence, or alternatively on an additional coach (wagon) that is towed or pushed by the payload along the track, there are mounted one or more of the means—an unmanned mini flying vehicle that at least is packed with an imaging sensor and that can be launched and landed from over the payload (or from the additional coach (wagon)); an unmanned vehicle, wherein it also is packed with a least an imaging sensor and that is given to be dropped unto the ground from the payload (or from said additional wagon).

It is to be understood that both the foregoing general description and the following detailed description are exemplary and explanatory and are intended to provide further explanations of the invention as claimed.

BRIEF DESCRIPTION OF THE ACCOMPANYING FIGURES

Examples illustrative of embodiments of the invention are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale.

FIG. 1 constitutes an illustration in perspective of an example of an adjacent to a fence security system in accordance with the invention.

Figure 2:
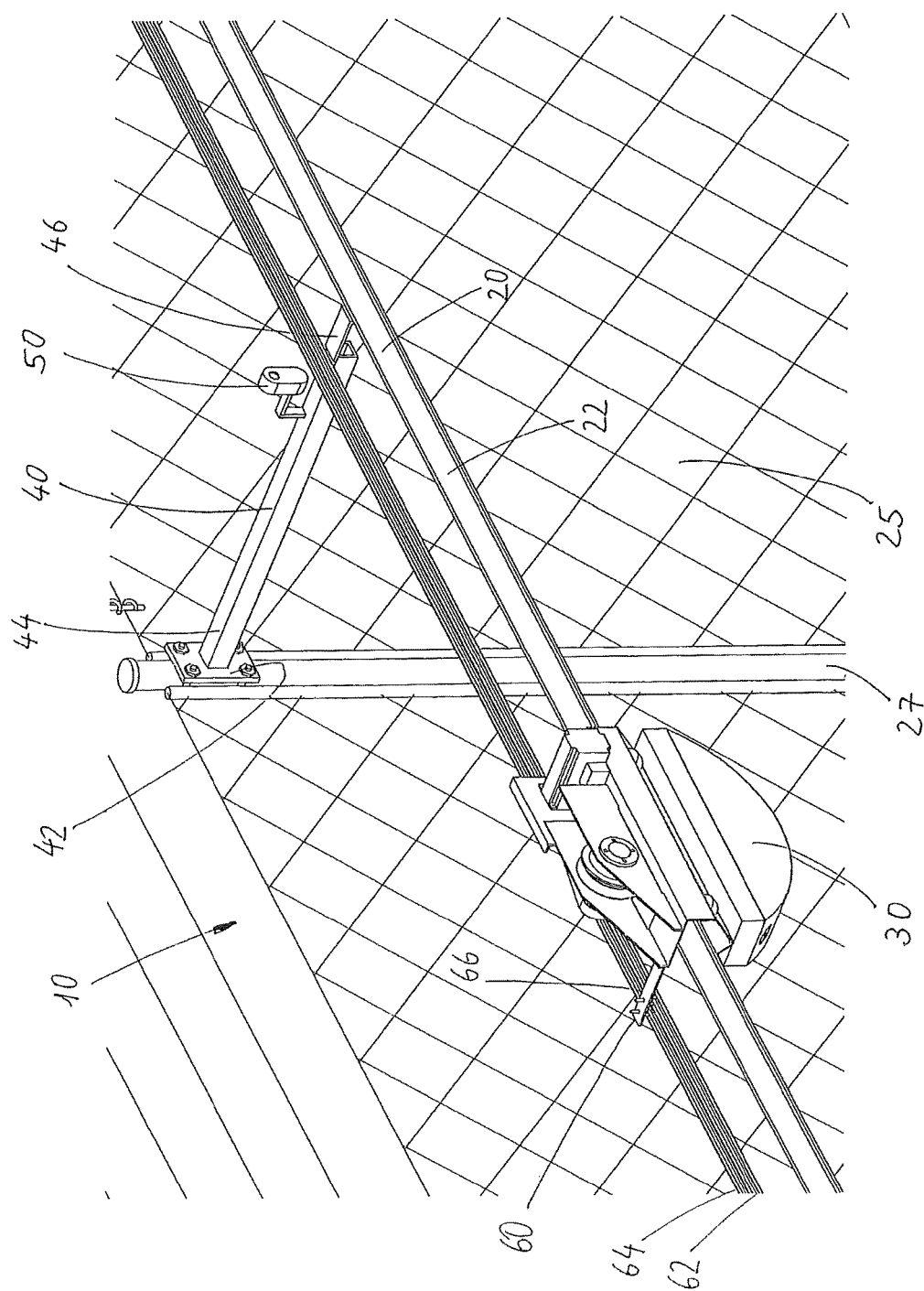

FIG. 2 constitutes a near view in perspective of a sector of the security system that is illustrated in FIG. 1.

Figure 3:
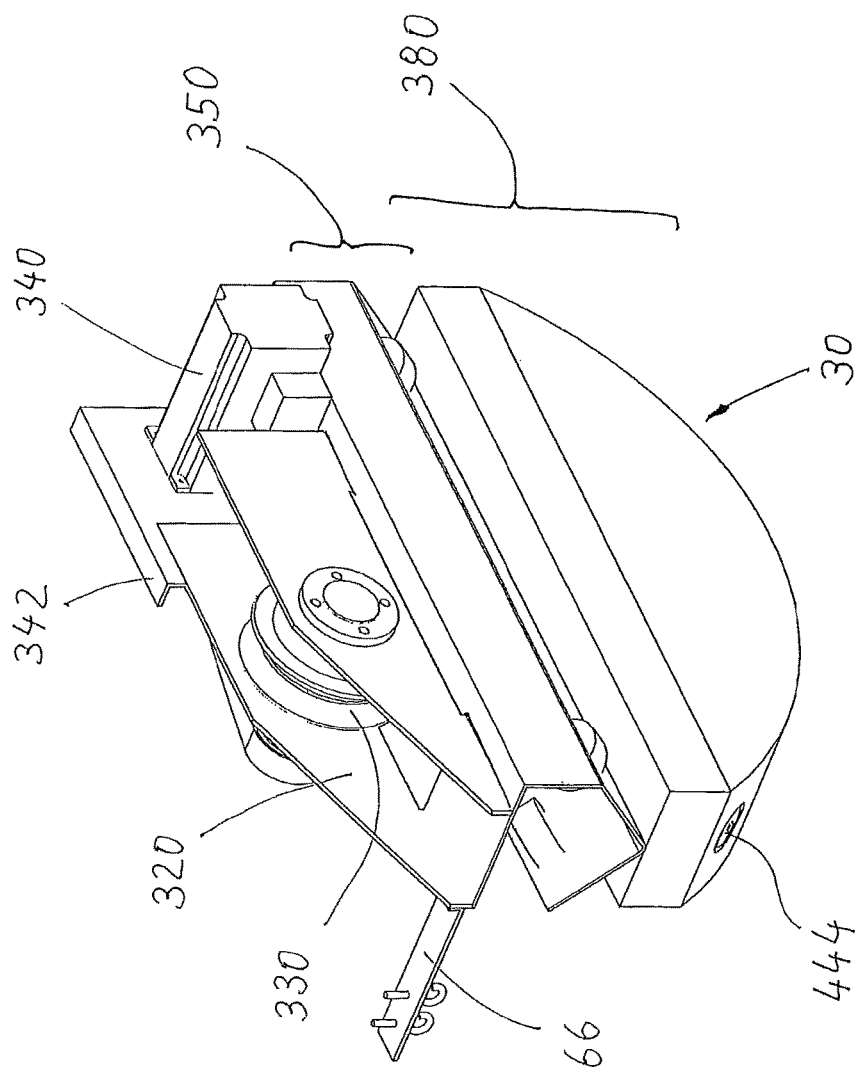

FIG. 3 constitutes a view in perspective of a mobile payload means in the security system that is illustrated in FIGS. 1 and 2.

Figure 4:
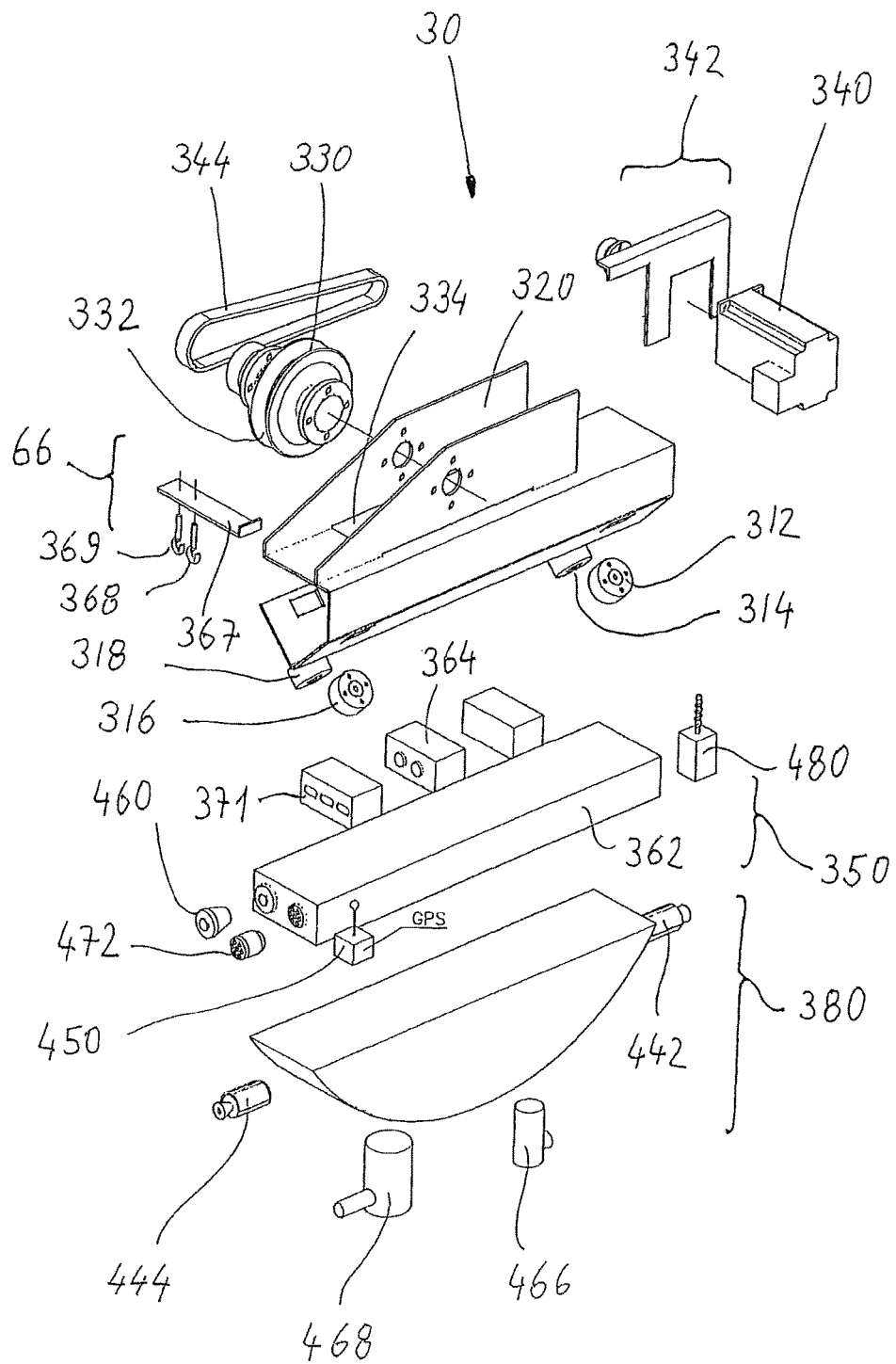

FIG. 4 constitutes an exploded view of some of the components of the mobile payload means that is illustrated in FIG. 3.

Figure 5:
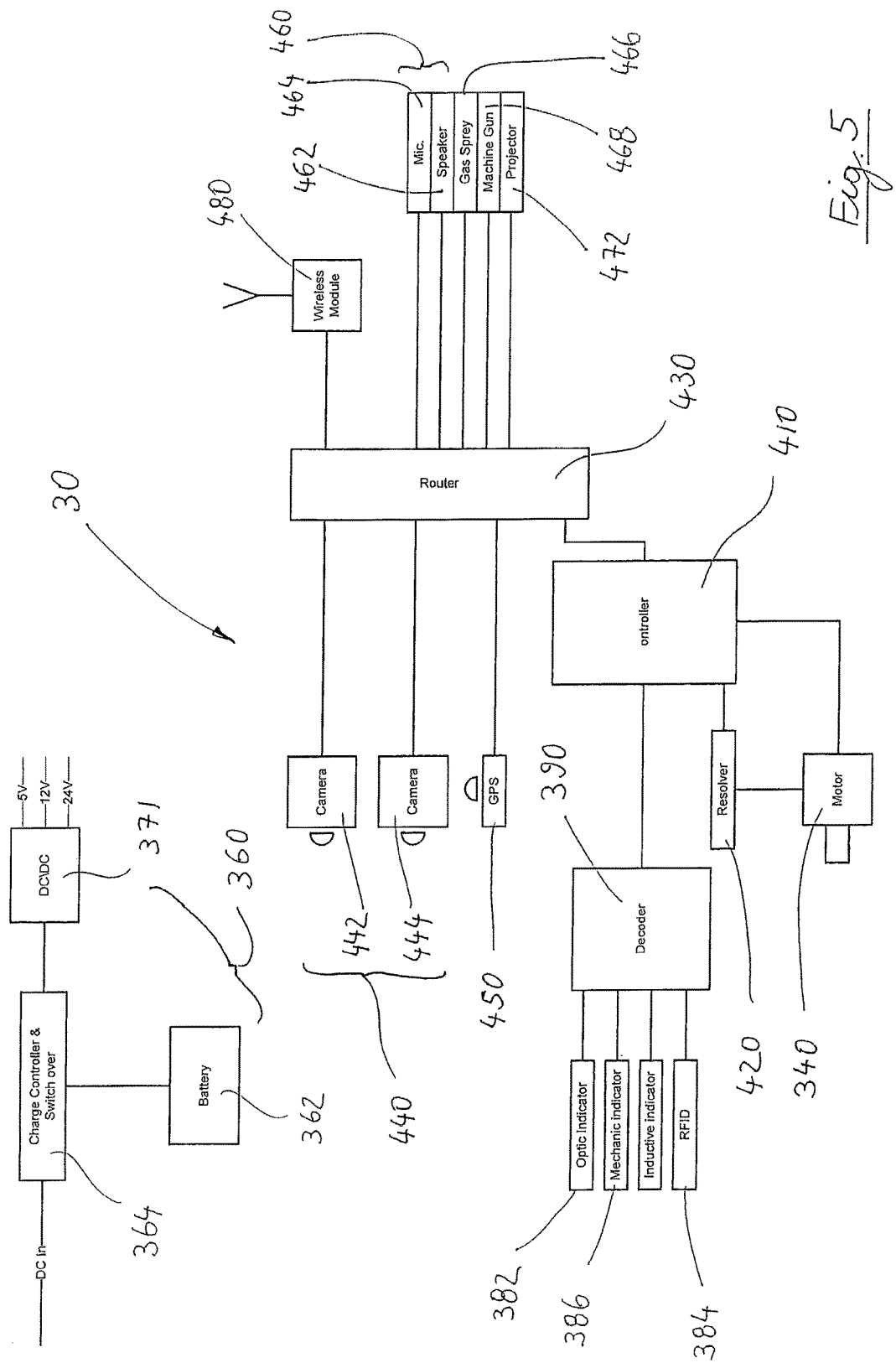

FIG. 5 constitutes a schematic drawing of the components of the mobile payload means of a system in accordance with the invention.

Figure 6:
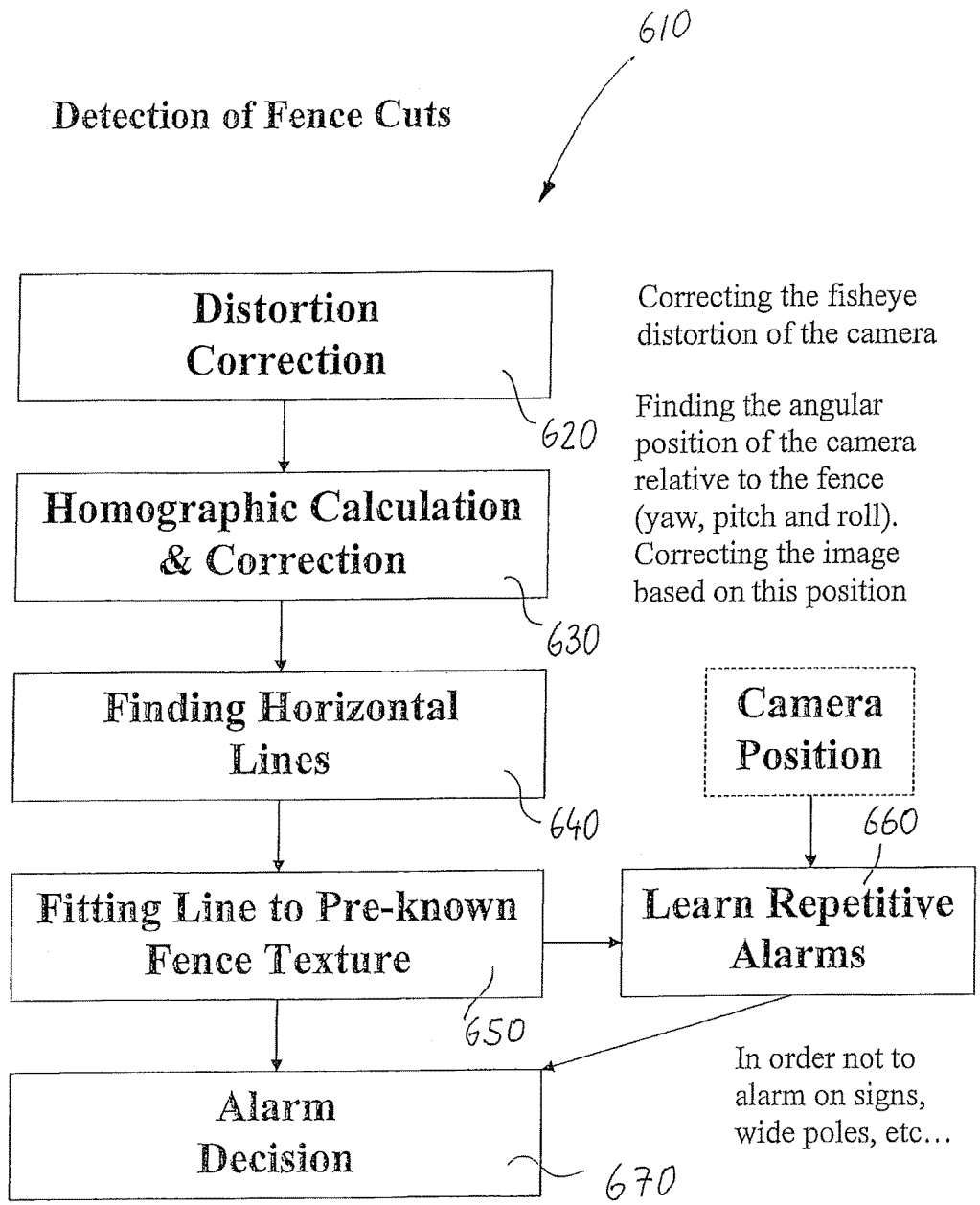

FIG. 6 constitutes a flow chart of an example of an algorithm for localizing a rip in a fence by utilizing image processing of images received from an imaging sensor of the mobile payload means in a system in accordance with the invention.

Figure 7:
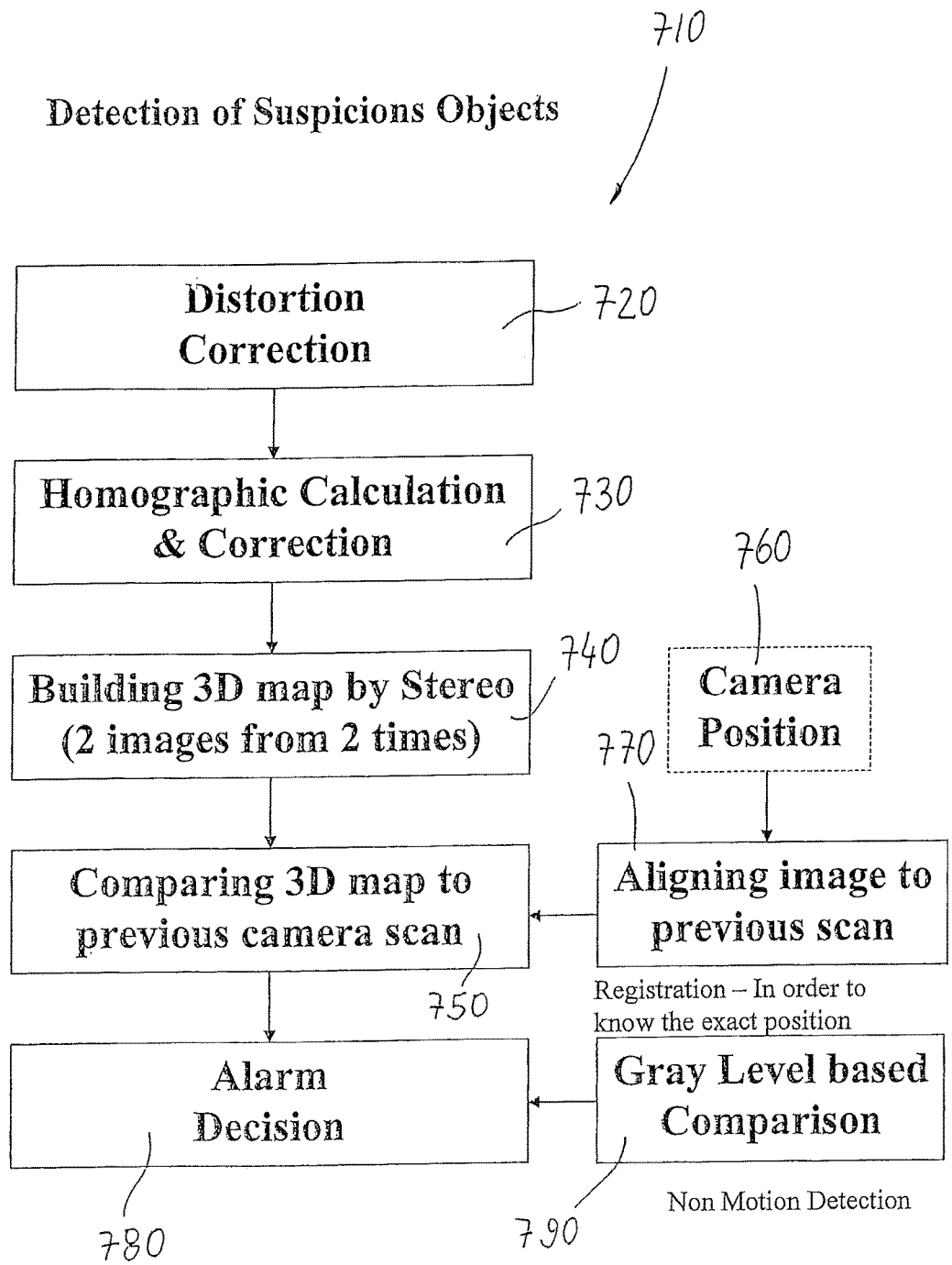

FIG. 7 constitutes a flow chart of an example of an algorithm for localizing a suspected item by implementing mage processing on images received from an imaging sensor of the mobile payload means a system in accordance with the invention.

Figure 8:
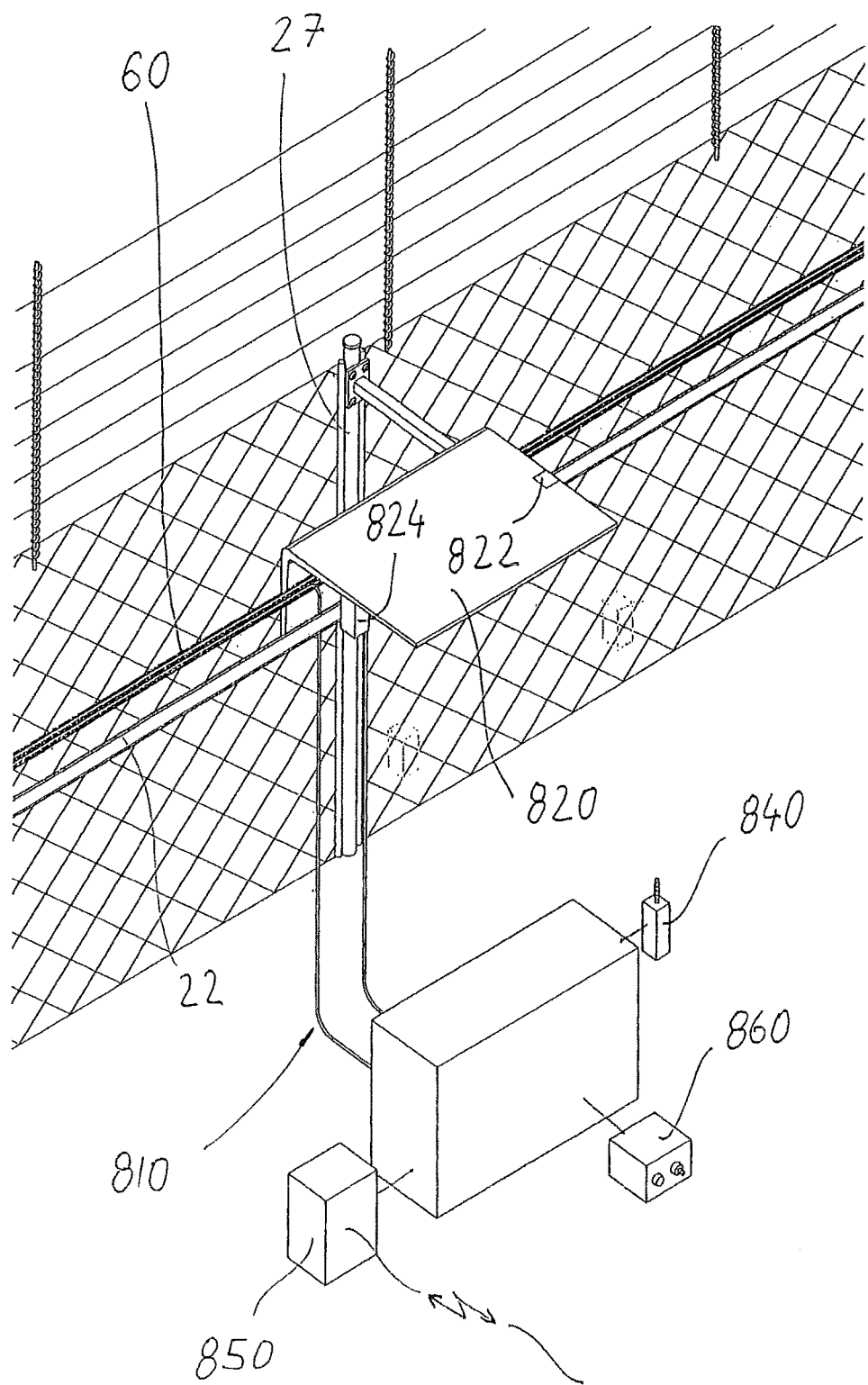

FIG. 8 constitutes a close view in perspective of a means for time to time anchoring of the mobile payload in the security system that is illustrated in FIGS. 1 and 2.

Figure 9:
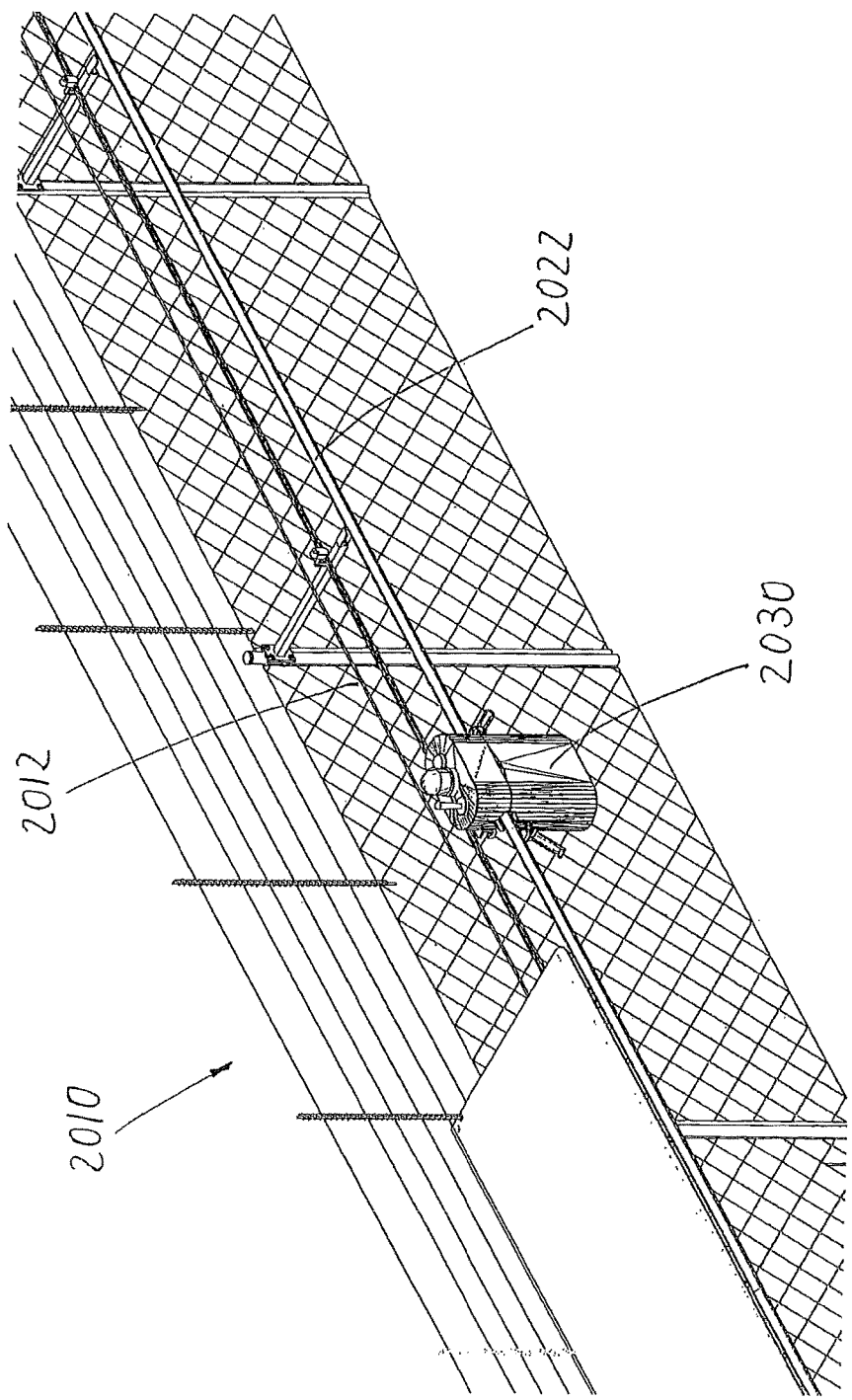

FIG. 9 constitutes an illustration in perspective of another example of an added fence coupled security system (an additional embodiment) in accordance with the invention.

Figure 10:
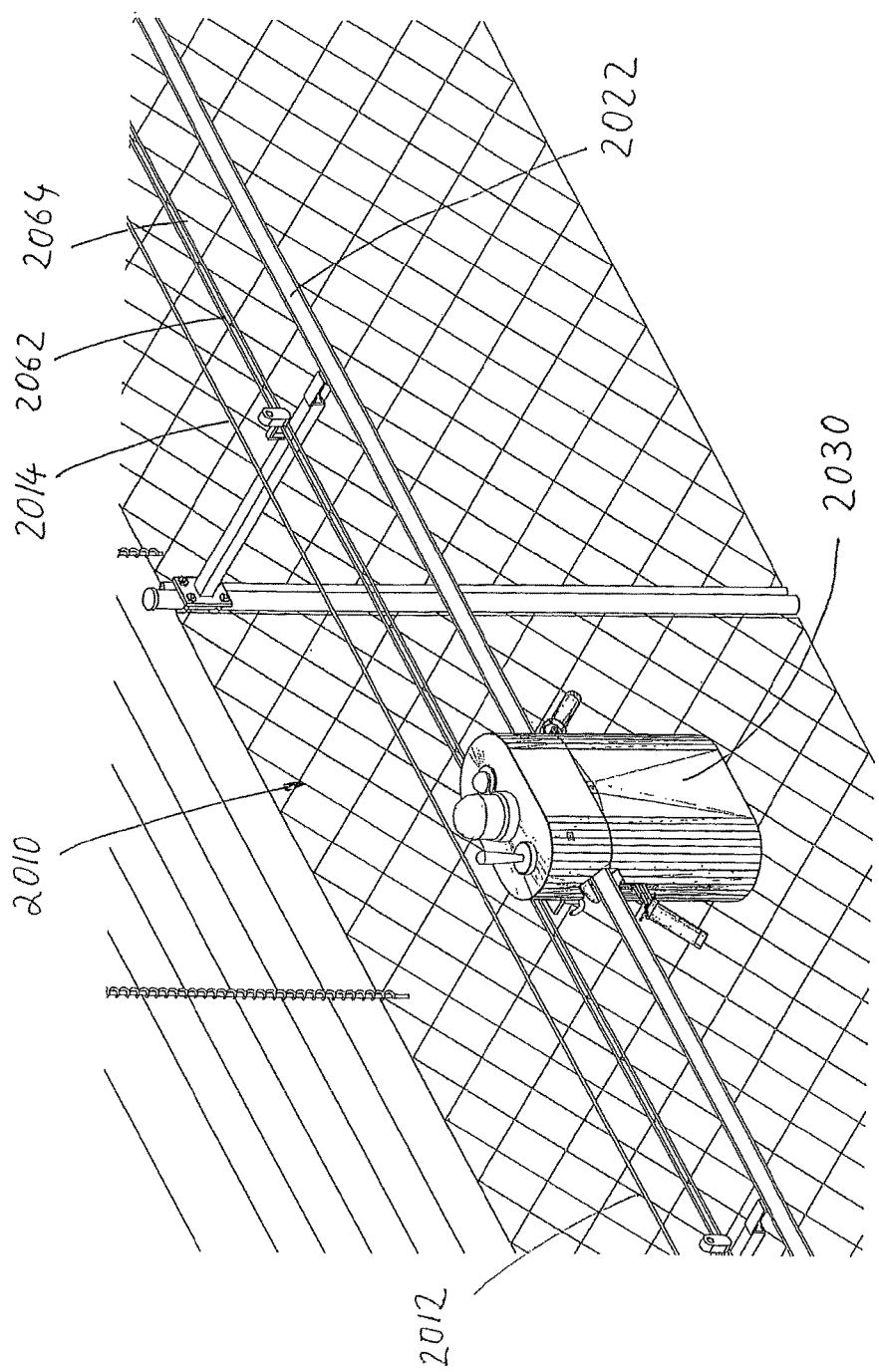

FIG. 10 constitutes a near view in perspective of the security system that was illustrated in FIG. 9.

Figure 11:
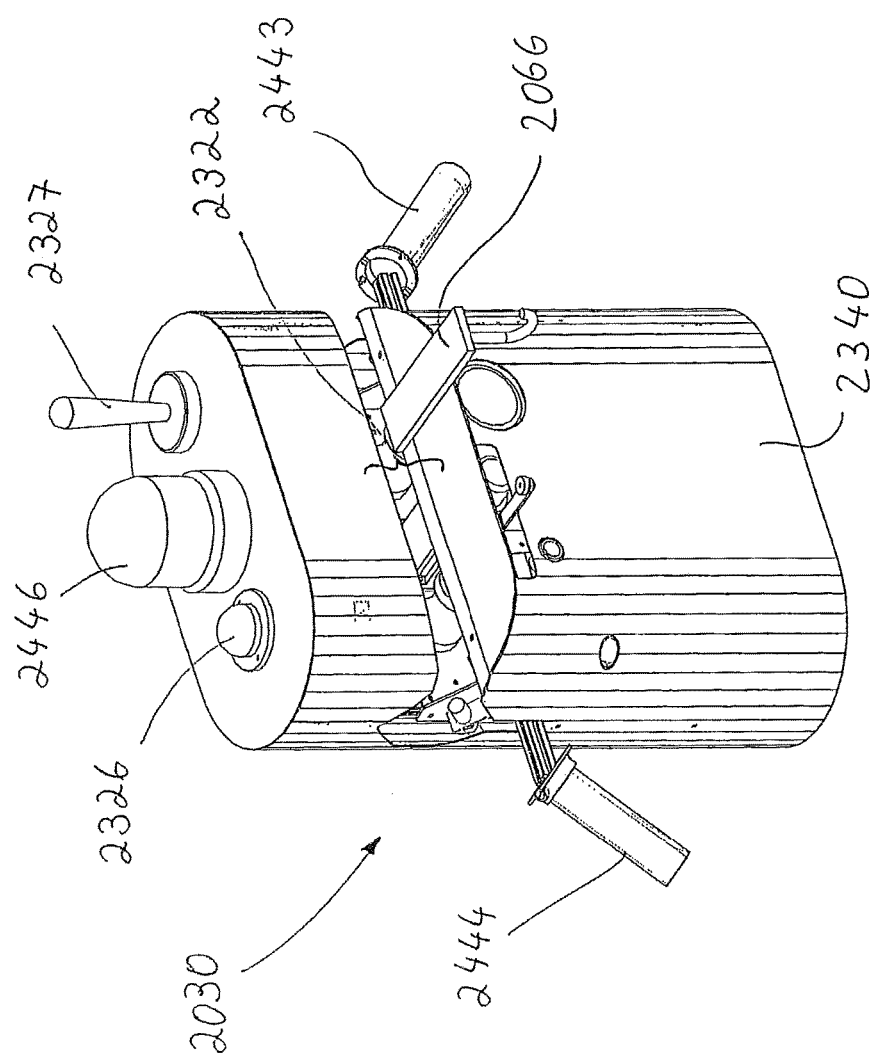

FIG. 11 constitutes a view in perspective of a mobile payload of the security system that was illustrated in FIGS. 9 and 10.

Figure 12:
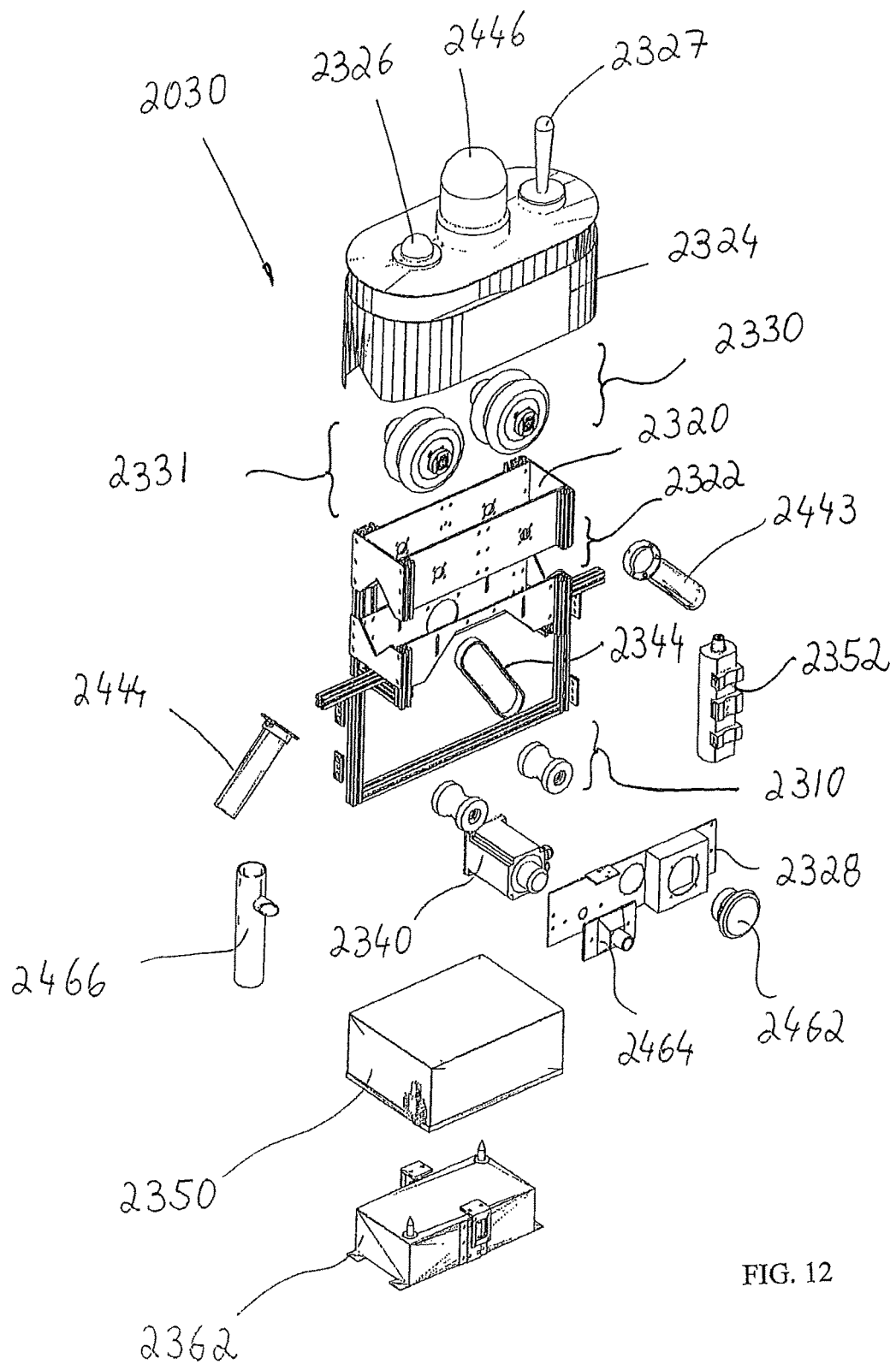

FIG. 12 constitutes an exploded view of several components of the mobile payload means that was illustrated in FIG. 11.

Figure 13:
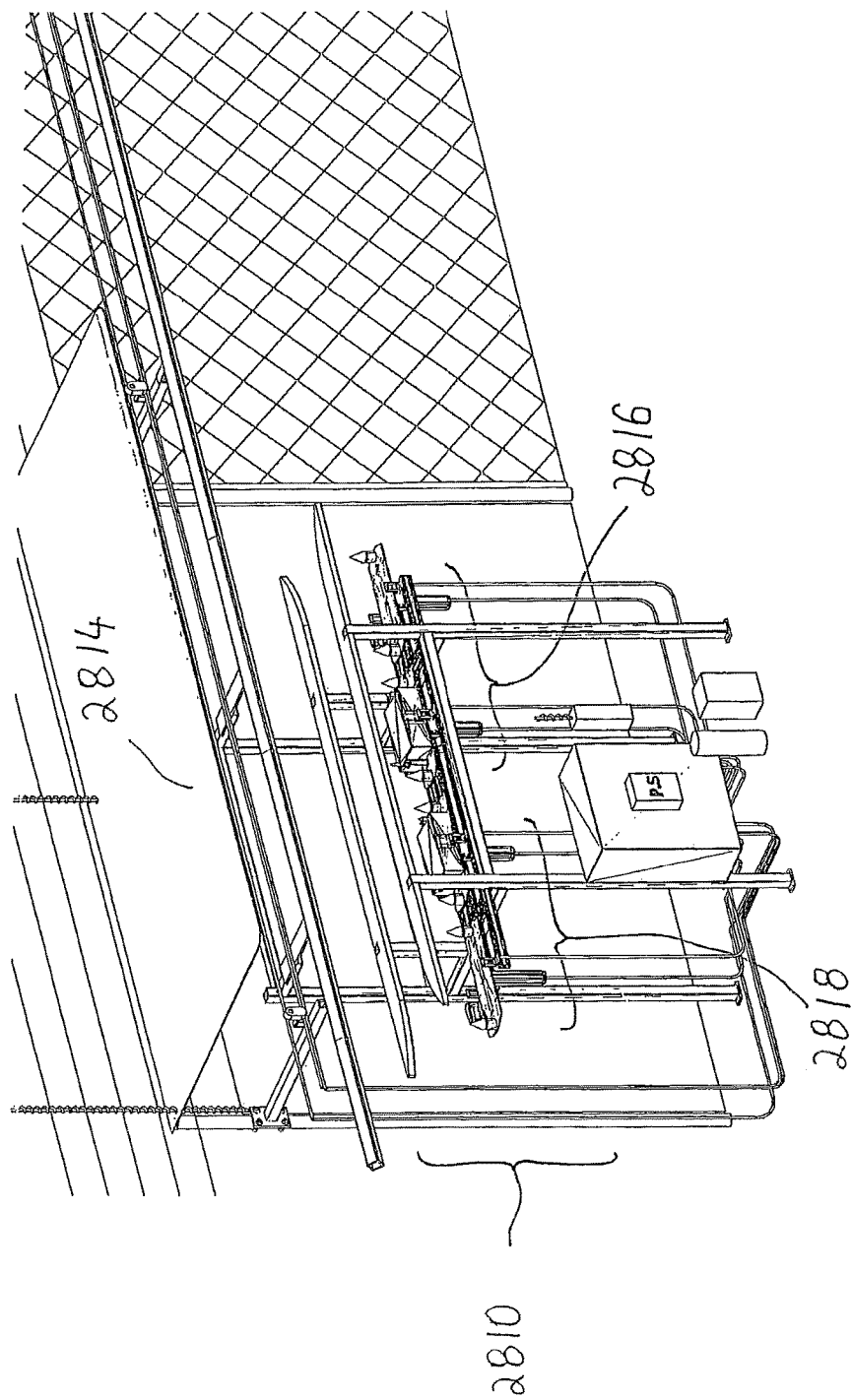
Figure 14:
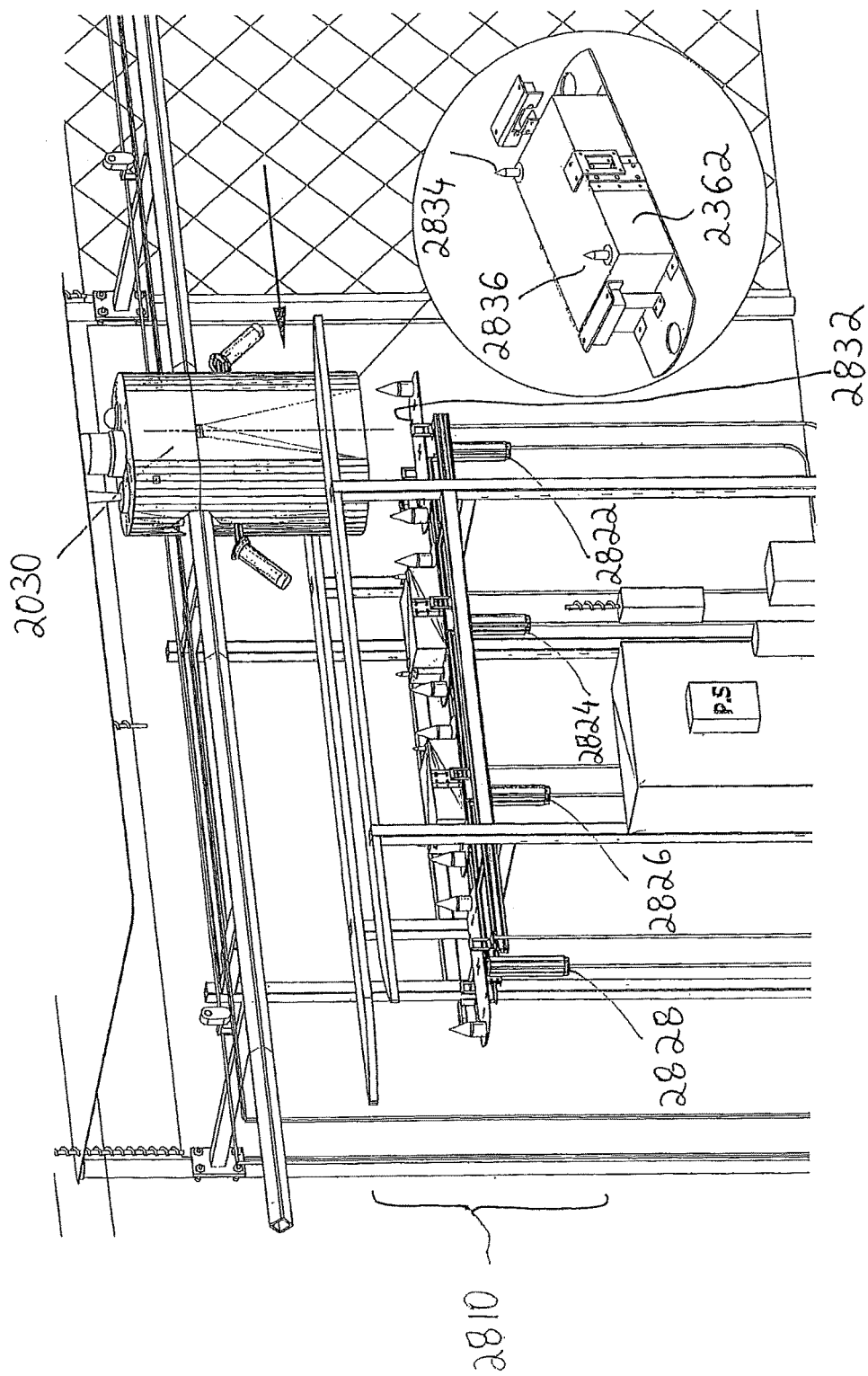
Figure 15:
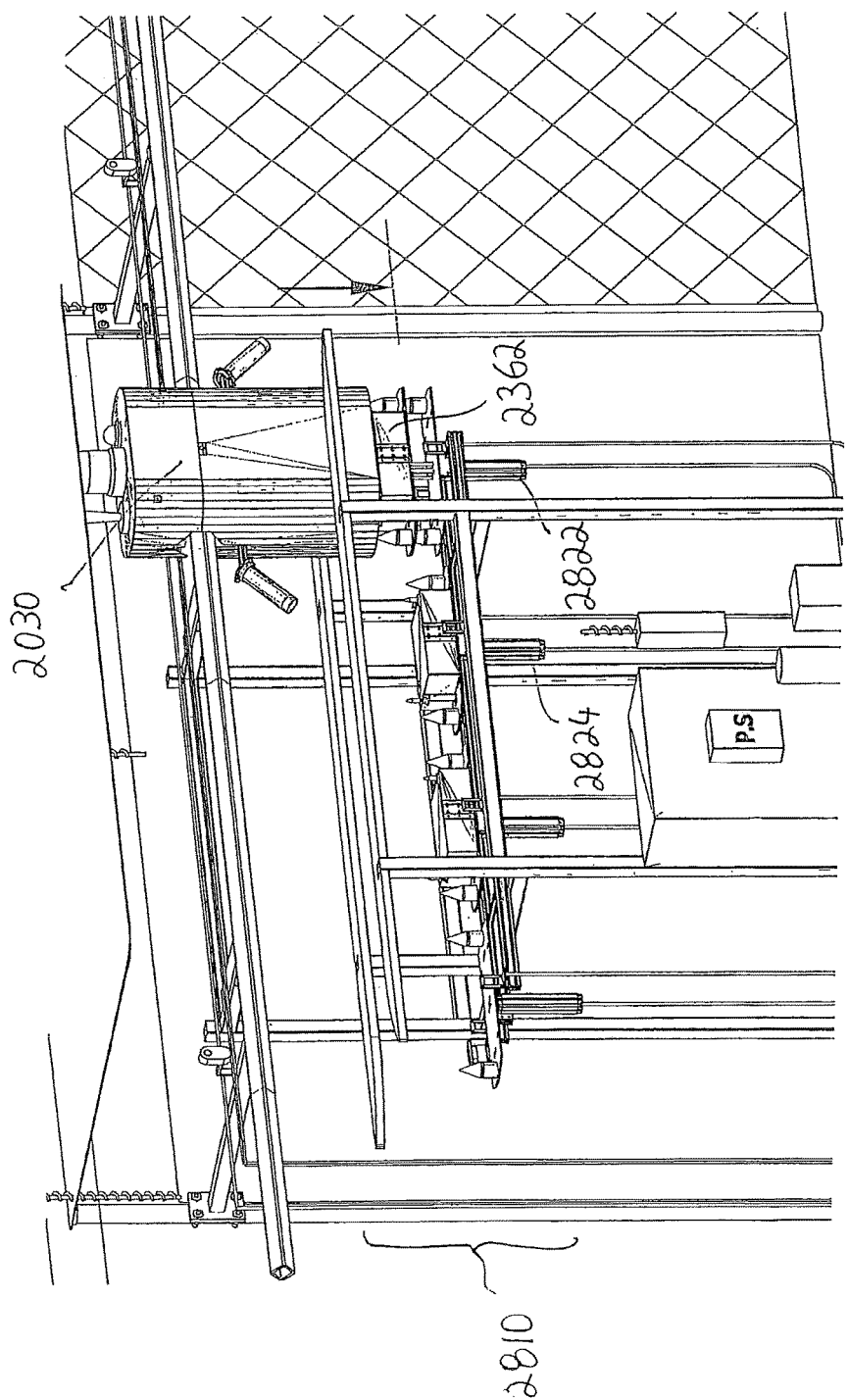
Figure 16:
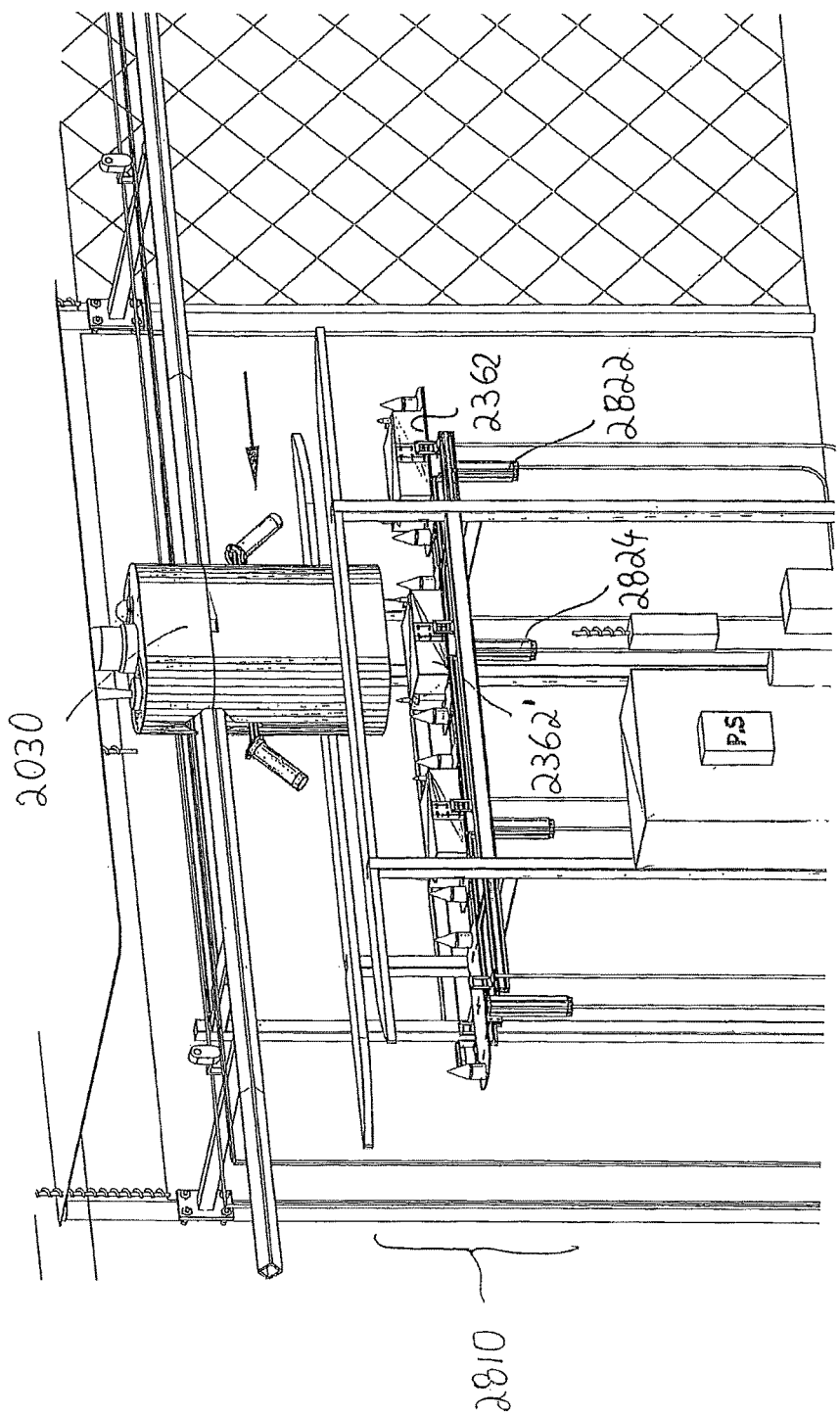
Figure 17:
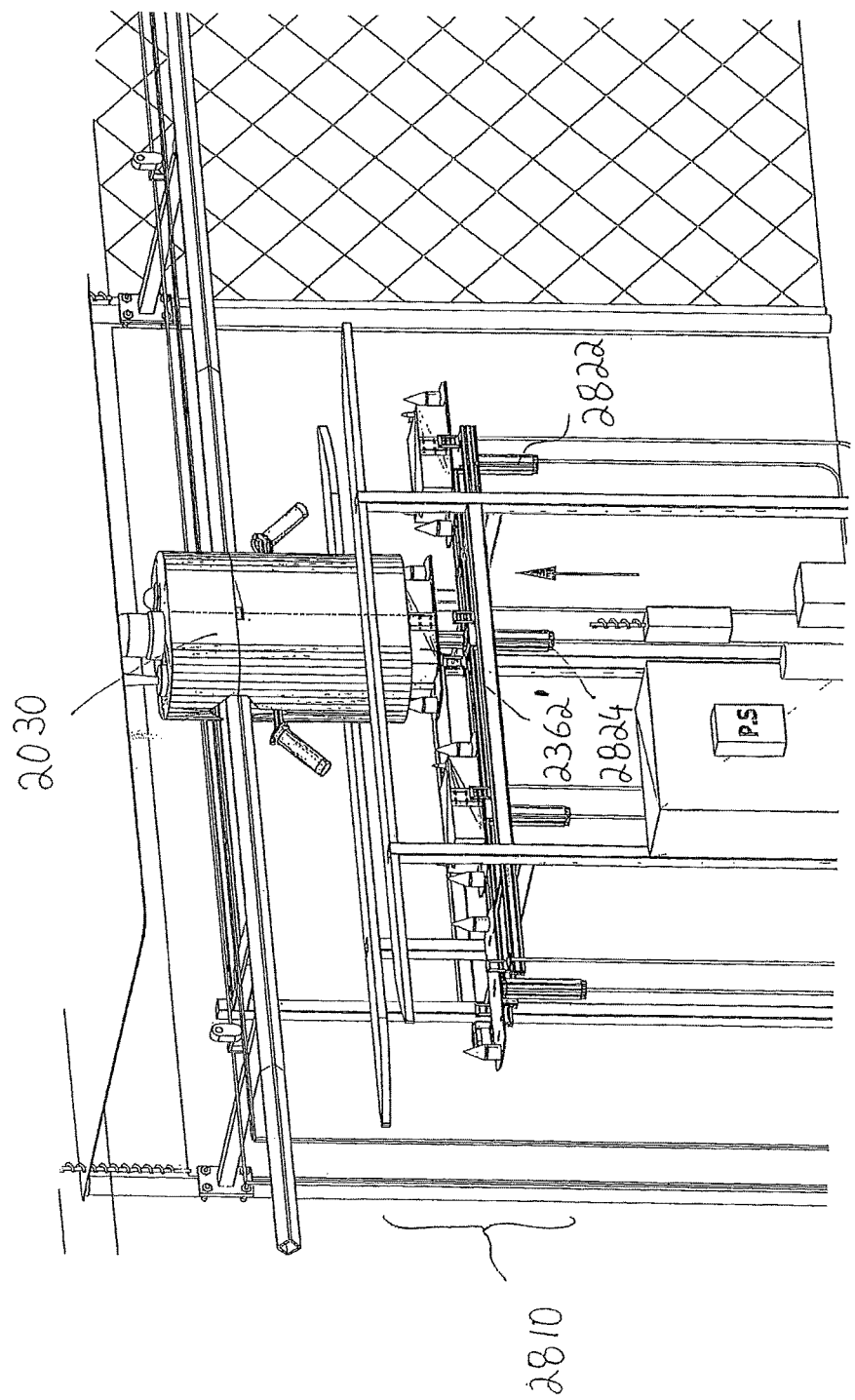

FIG. 13 constitutes a near view in perspective of means for anchoring from time to time the mobile payload means of the security system that was illustrated in FIGS. 9 and 10.

FIGS. 14 to 17 show a near view in perspective of the means for anchoring (from time to time) the mobile payload means that is illustrated in FIG. 13, wherein the illustrations show its various operating states—dismantling the battery of the mobile payload and exchanging it by a new one.

FIG. 18 constitutes an illustration in perspective of additional configuration of a system in accordance with the invention wherein the "on a track propelled payload means" comprises a bi-dimensional laser means for a tri-dimensional mapping of the vicinity of the payload while the payload is moving (travelling) on the track.

FIG. 19 constitutes an illustration of the mode of scanning provided by the laser means that is illustrated in FIG. 18.

Figure 20:
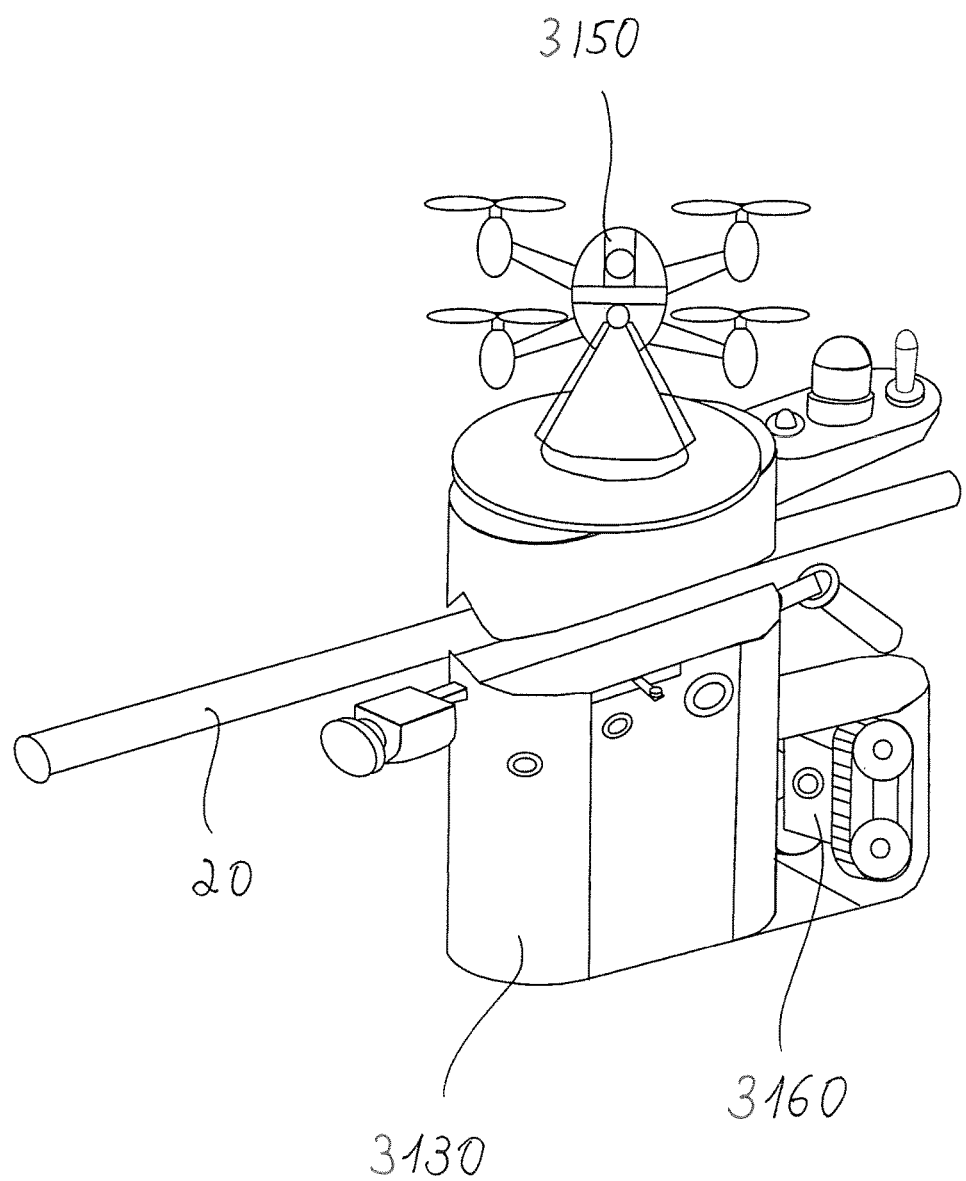

FIG. 20 constitutes an illustration in perspective of an additional configuration of a system in accordance with the invention wherein on the on a track propelled payload means there was mounted a (mini) un-manned flying means that is given to be launched from over the payload means and an unmanned vehicle that is given to be dropped to the ground from the payload means.

Figure 21:
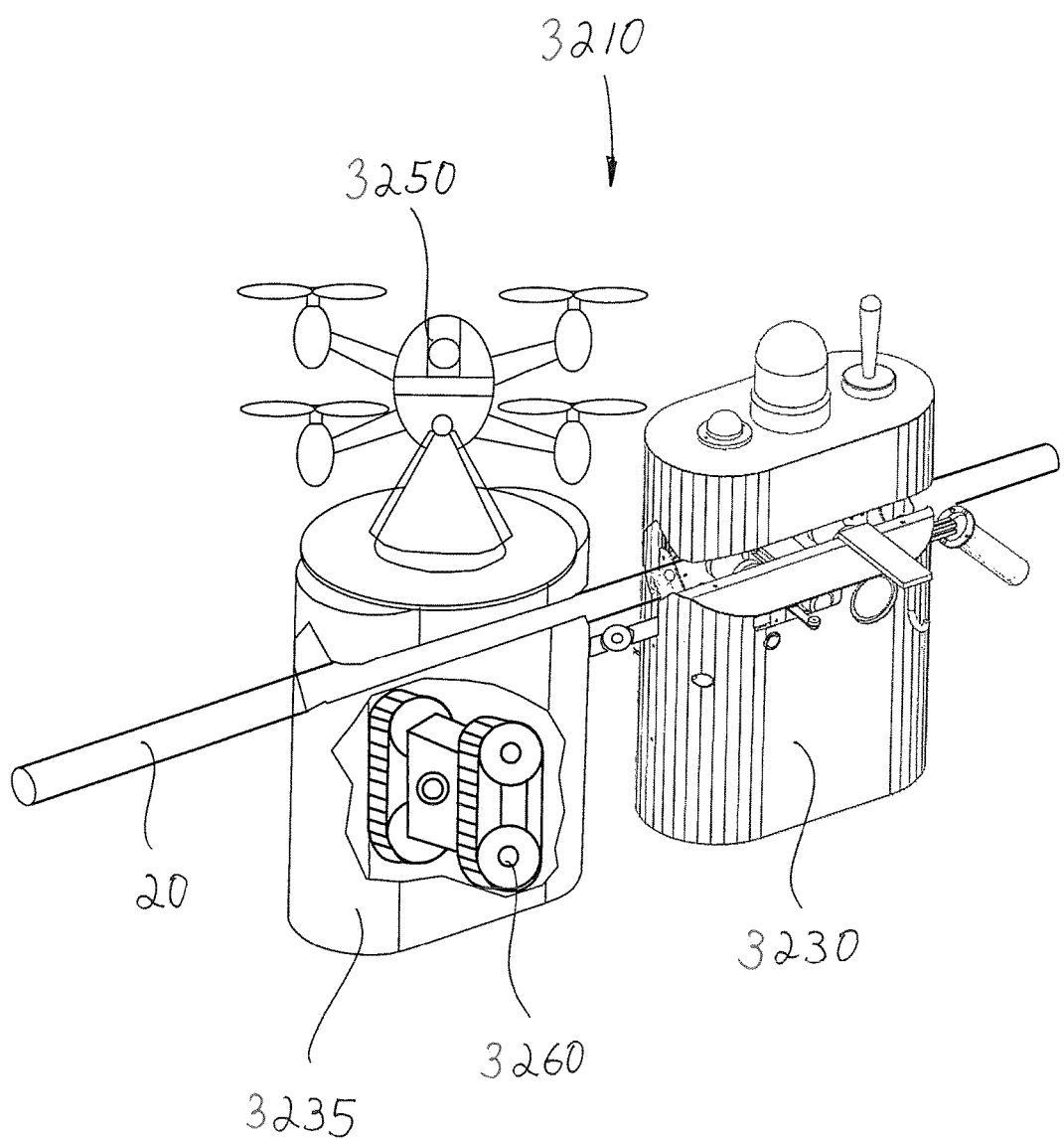

FIG. 21 constitutes an illustration in perspective of an additional configuration of a system in accordance with the invention wherein to the on a track propelled payload means there was added also a wagon that is towed by it and wherein on it there are mounted said un-manned flying means that is given to be launched from over the wagon as well as an unmanned vehicle that is given to be dropped to the ground from the wagon.

Figure 22:
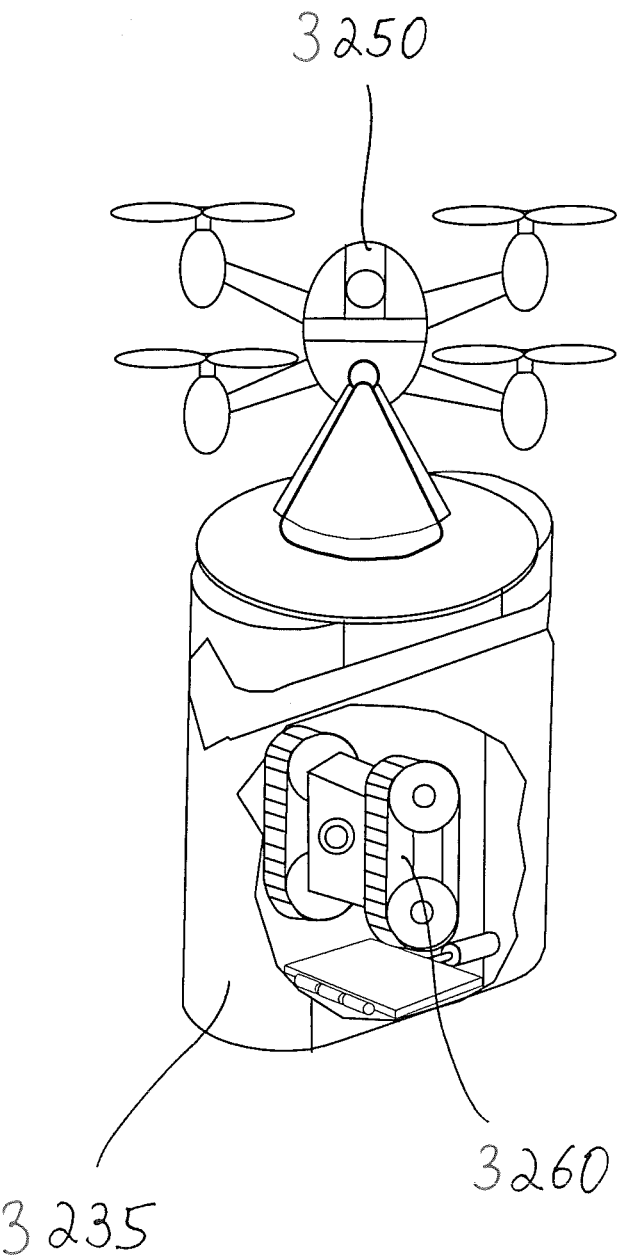

FIG. 22 constitutes an illustration in perspective of the wagon that is illustrated in FIG. 21.

Figure 23:
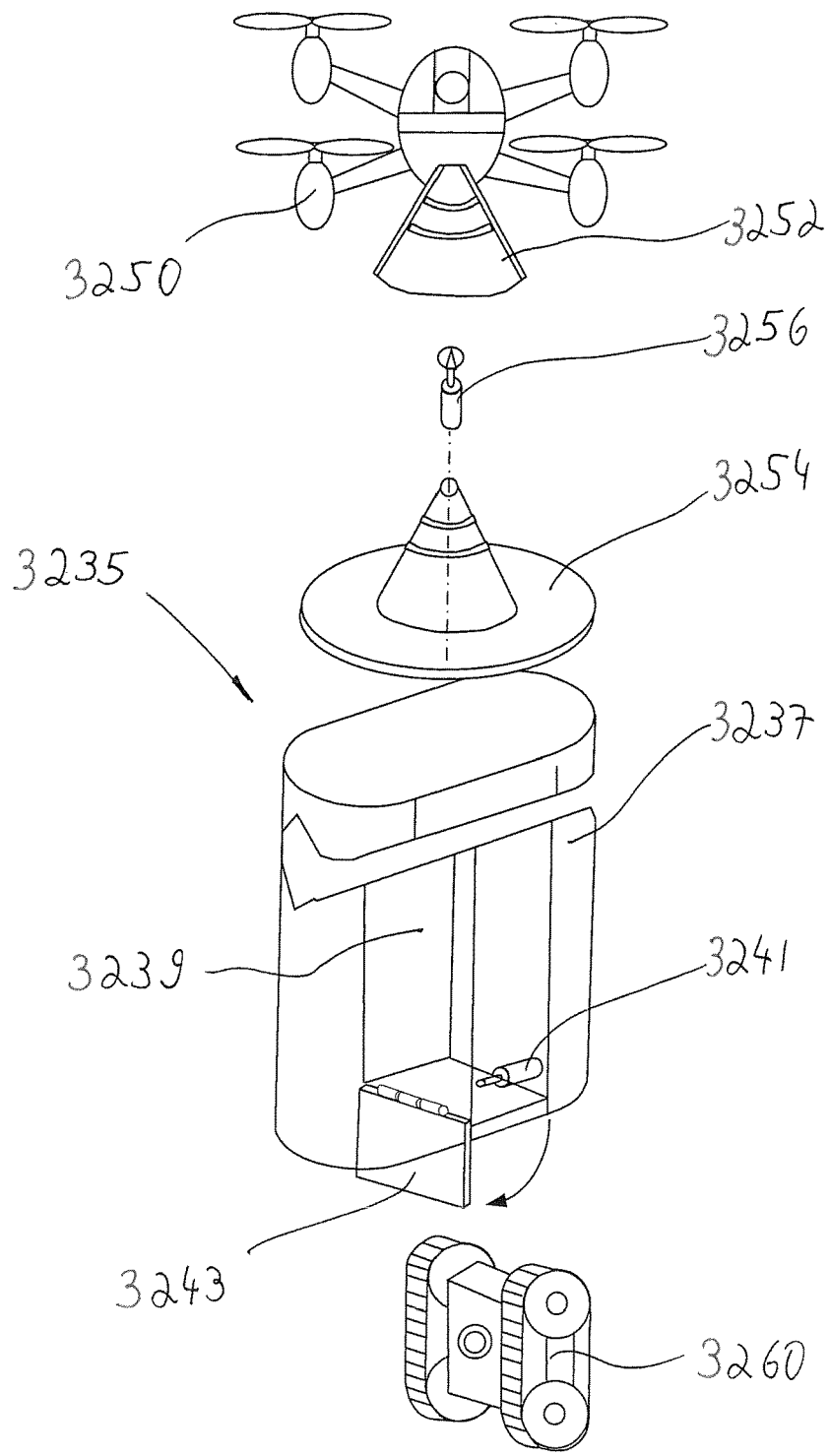

FIG. 23 constitutes an exploded view illustration of the components of the wagon that are illustrated in FIG. 22.

FIG. 24 constitutes an illustration in perspective of an additional configuration of a system in accordance with the invention wherein to the on a track propelled payload means there is added a wagon that is towed by it and wherein on it there is mounted an un-manned flying means that is given to be launched from (over) the wagon.

FIG. 25 constitutes an illustration in perspective of an additional configuration of a system in accordance with the invention wherein to the on a track propelled payload means there is added a wagon that is towed by it and wherein on the wagon there is mounted an un-manned vehicle that is given to be dropped to the ground from the wagon.

DETAILED DESCRIPTION OF AN EXAMPLE CONFIGURATION OF THE INVENTION

Reference is made to FIGS. 1 and 2. FIG. 1 constitutes an illustration in perspective of an example of a self-propelled security system on an adjacent to a fence track 10 in accordance with the invention. FIG. 2 constitutes a near view in perspective of a sector of security system 10.

System 10 comprises rail track means 20 that extends at a height above the ground along fence 25 and in parallel to it. Payload means 30 is connected to rail track means 20 and suited to move along its length. Payload means 30 comprises at least one imaging sensor (that is not illustrated), that from the instant of installing payload means 30 on rail track means 20 is turned towards fence 25.

In system 10, rail track means 20 is characterized in that it comprises an exposed track 22 (that is not covered with any housing whatsoever). In the illustrated example, track 22 has the configuration of a rhombus (diamond) profile. Rail track means 20 is anchored to poles 27 of fence 25 wherein exposed track 22 protrudes from them and is positioned at a distance to the fence's surface plain and parallel to it (see marking of the distance D). Payload means 30 is characterized in that it is autonomic in its movements on the exposed track 22, and is also exposed in itself to the fence.

System 10 is suited to be installed on an existing infrastructure of an intrusion detection fence (as an add-on type of a system that upgrades the existing fence and provides it with additional capabilities).

In the illustrated example, fence 25 is an already existing intrusion detection fence having an array of poles 27 that are stuck in the ground along its length. Installing system 10 on the existing fence infrastructure is executed using supporting means 40 that connects track 22 to the existing poles of the fence and supports the track. In the illustrated example, supporting means 40 comprises—a flange 42 that is suited to being connected to an existing pole of the fence (for example by an assemblage of screws), an elongated rod 44 (for example, a rod having a square profile) that is connected on its one end to the flange assembly and on its second end to an elongating rod 46 unto which track 22 is connected.

System 10 includes in addition, marking means 50 that are positioned along fence means 20. From the instant of the passing-by of the payload means 30 near the marking means 50, the reading of the information on them is enabled, by means of a reading means (that is not illustrated) that is installed on payload means 30.

In the illustrated example, marking means 50 are illustrated as they are mounted over each one of the supporting means 40, but any professional would understand that we are referring solely to an illustration of an example and marking means 50 can be mounted on only some of the supporting means, or on additional places along the payload means movement path.

Marking means 50 is amenable to enable calibration of the system by way of providing a variety of indications, for example—position of the payload means relative to the sector in which it is moving, marking end of a sector which requires the payload to stop and to change its travel direction, entering a specific site (for example anchoring station or a base), marking a limited traveling speed (locally) to the movable payload means, namely—a limited speed that is required in a specific sector wherein a specific marking means is located (e. g., due to existence of a sharp turn, ascending or descending sectors, etc.), marking an end of limited speed zone (where the sector ends), verifying the traveling direction of the payload and etc. In other words, erecting an array of marking means 50 along the payload travelling path, enables "reading" local data (information) for updating the payload's propelling control system. Reading the marking means would provide (issue) coded data that might be decoded by decoder found on the payload. The deciphered data would lead to commands directed to the propelling means of the payload means proper and to optional transmissions of messages that would pass to a remote control station, directly or via concatenating the message via a relaying station (for example, in cellular communication from the payload to a relay station that would continue and transfer the message by a line communication).

For the sake of transferring the information (data) from the marking means to the payload, it is feasible to implement a variety of existing technologies that can be used, for example a barcode which can be read by a suitable scanning eyepiece that would be mounted on the payload in a manner that it would be a receiving means for a control means that would be mounted on the payload. A barcode as said could be of the cellular barcode variety: (QR Code), (Quick Response Code). For scanning the barcode that would be mounted on marking means 50 it is feasible to implement, on payload 30, a variety of known readers ("scanners"), for example a laser scanner (sending a laser beam unto the marking means for reading the characters and transferring them to digital data), a CCD Sensor (illuminating the barcode and decoding the returned images) or an imager that would image the barcode and transfer it to a pictures' pixels and software that would be installed on the payload would decode the data and use it. Other technologies that can be used for "reading" local data from the track can be mechanical switches or electrical micro switches that can be posted along the movement path of payload 30, or for example an RFID (Radio Frequency Identification) unit that enables electronic tagging by radio waves. Small tags can be attached along the payload's path wherein they store on them data elements that would be read electronically by radio (wireless) means from the payload. The tags might be passive—without a power source, wherein an electronic inductive source would be installed in the payload for exciting them when it passes by them, or active that would use an internal cell or a solar power source or the system infrastructure's electrical power supply or half passive tags.

In the illustrated example, system 10 comprises in addition, an electricity conducting means 60. The power supply to payload means 30 is executed by feeding low voltage on a couple of electricity cables 62, 64 that are spread along track 22 in parallel to it and at a certain distance from it. Electricity cables 62, 64 are suited to being connected with payload means 30 for feeding voltage to a battery installed in there (that is not illustrated). Connecting means 66 bridges payload 30 to electricity cables 62, 64 in a manner that enables sliding on them while maintaining the electrical contact.

Any professional would understand that the electricity conducting means is discussed solely as an example, and supplying voltage to the payload means can be executed by other, various and different means. For example, by batteries that would be charged from time to time, or be replaced with fresh batteries (see hereinafter while referring to FIGS. 9-17), at a time of anchoring of the payload in a specific anchoring station that will be connected to the electricity power supply cables (sources) or to an independent power supply source—for example an array of solar cells. Another option supplying the needed electrical power by feeding low voltage from bus bars that would be located along the rail track as an integral part thereof.

In addition, any professional would also understand that deploying an electric power network along and parallel to the track might also serve as a marking means for passing local signals to the payload (for example by "coding" on/off (contact/cut) signals series along the electric power cables and deciphering those indications of contact/no contact on the payload side).

Reference is made to FIGS. 3 to 5. FIG. 3 constitutes a view in perspective of a mobile payload means 30 in a security system 10. FIG. 4 constitutes an exploded view of some of the components of mobile payload means 30. FIG. 5 constitutes a schematic drawing of the components of mobile payload means 30.

Payload means 30 constitutes an example of a mobile payload in a system in accordance with the invention. Payload means 30 comprises an array of supporting wheels 310 that are intended to connect to rail track 22 (see FIGS. 1 and 2). In the illustrated example, what is depicted are four wheels 312, 314, 316 and 318 that are ready to be installed on the two sides of bracket assembly 320, in a manner that from the instant of installing (affixing) them on bracket assembly 320 they are supported on the two sides of the lower part of the rhombus (diamond) profile of track 22 (see FIGS. 1 and 2). Accelerating wheel means 330 is suited to be installed on bracket assembly 320 wherein it is formed with a conic opening 332 around its complete circumference. From the instant of installing the wheel, it protrudes through opening 334 that is formed in bracket assembly 320, in a manner that conic opening 332 is supported on both two sides of the upper part of the rhombus (diamond) profile of rail track 22 (see FIGS. 1 and 2).

Propelling means 340 (an electric motor) is affixed to bracket means 320 by an adapter means 342 and to accelerating wheel 330, in the illustrated example—through a band (strip) transmission 344, for propelling the accelerating wheel and by this to bring about to propelling the payload means to moving along the length of the track. Any professional would understand that the propelling means can be operated at variable speeds for example at high speed when launching the payload towards a site in the fence from which a warning was received and at a rather low speed in cases of a routine patrolling and can be also operated by remote control when a need arises ("enslaving" the payload to remote command and control state also for the aspect of the payload speed of traveling along the rack).

Under bracket assembly 320 and wherein it is affixed to it there is found package 350 of the electricity power source (supply) of payload 30. In the illustrated example, package 350 comprises electricity power means 360 that comprises battery 362 that is connected to a charging and switching controller 364. As per the controller, it receives low voltage feeding from linking means 66 that, as said, bridges between payload 30 to electricity cables 62, 64 (see above, the references to FIGS. 1 and 2) and serves as means to charging battery 362. Linking means 66 comprises bridging component 367 unto which sliding components 368, 369 are connected, that are suited to sliding while maintaining the electric required contact over the feeding cables 62, 64 (see there, where referring to FIGS. 1 and 2), for maintaining low voltage feeding to battery 362 while, at the same time the payload is in motion. The electricity power means includes also a voltage converter 371 that converts the supply of electric power as required to the various assemblies of the payload that require electric power and the converter is also connected to a charging and switching controller 364.

Under package 350 and as it is affixed to it, there is located package 380 of the sensing and control means. In the illustrated example, the package comprises optical reading means 382 that enables reading the data (information) that was coded in a barcode fashion on marking means 50, that as said, are positioned along the track (see above when referring to FIGS. 1 and 2), as well as reading means 384 for identifying in a radio frequency (RFID) of the information tags that—they as well, might be positioned on marking means 50. The package comprises also velocity sensors 386 and "road" sensors 388 that measure, on the payload's "deck" the speed of the payload and the distance ("road") that was traversed by referring to the accelerating wheel encoders. The reading means and the sensors are linked to a decoder 390 that, on its turn, is linked to a controller assembly 410 that is also linked to a propelling means 340 (through resolver 420).

Controller assembly 410 is linked to a router means 430 that on its turn is linked to imaging sensors 440 (in the illustrated example—two CCD cameras 442, 444), to a GPS based position sensor 450 (that enables additional calibration by receiving an indication in addition to that that is received from the marking means, regarding the absolute position of the payload at any given moment), and to a variety of remotely operated means that are liable to be positioned on the payload and remotely operated from far away of it, in the illustrated example—audio means 420 (public-address system enabling announcements trough speaker 462 and listening through microphone 464), non-lethal weapons of the tear gas sprayer genre 466, firing means (for example—sub machine gun) 468 and illuminating means (e. g. projectors) (for example—LED lamps) 472.

Any professional would understand that what has been presented were solely examples, wherein additional and different means might also be remotely operated from the payload's "deck" (for example—smoke canister launcher, grenades launchers, paints sprayers, electronic countermeasure means (e.g.—means for blocking remotely send signals for detonating a roadside bomb)).

A wireless communication module 480 is connected to router 430 and enables passing information to a distanced control room (that is not illustrated) and receiving commands from it, directly or by concatenation of the message or the commands through a relaying station (for example—by cellular communication from the payload to a relaying station that would continue and transfer the message by lines (cables) communication and vice versa). Any professional would understand that we are relating solely to an example and that the communication means are liable to be others and different (for example deploying line communication means along the track as an integral part of it—or for example optical fibers that are connected to the payload all the time). The video communication from the payload is liable to carry signatures of times and locations given as data of time and position via the controller assembly.

The relative proximity of the imaging sensors in a system in accordance with the invention to the fence surface (plain) and the ground surface near to the fence (see FIGS. 1 and 2), enable reception of pictures in their relative high resolution. This capability enables implementing an images processing system in order to evaluate the images received from the imaging sensors for automatic detection of defined (in advance) images as indication of intrusion occurrence through the fence or other threats. The image processing is carried up on the payload's "deck" (by installing suiting computing means) or remotely (in a computer located in the control room and by relaying on the images transmitted from the payload).

Reference is made to FIGS. 6 and 7. FIG. 6 constitutes a flow chart of an example of an algorithm 610 for localizing a suspected item by implementing image processing on images received from an imaging sensor of the mobile payload means a system in accordance with the invention. FIG. 7 constitutes a flow chart of an example of an algorithm 710 for localizing a suspected item by implementing mage processing on images received from an imaging sensor of the mobile payload means a system in accordance with the invention.

Algorithm 610 for localizing a rip in the fence includes the stage of distortion correction 620 in which the picture of the "fish eye" lens that is produced from the imaging sensor (with the task of photographing an as large as possible sector of the near by fence, for example—an 120° sector of the near by adjacent fence surface that is located at a distance of 70 cm from the imaging sensor), is corrected as needed for the requirements of image processing. In the following step 630, holographic calculation and correction is executed. Because in this example, the imaging sensor is not stabilized, the processing system finds the angular position of the imaging sensor in relation to the fence's surface (in the yaw, pitch and roll plains) and corrects the picture in accordance with the angular location. In the following step 640, the images processing system searches for visual layouts in the picture, that are recognized as characteristic to the specific fence. For example, a layout of continuous (sequential) lines that extend in the horizontal direction with spaces one from the other, as a characteristic layout of a fence surface of the taut wires fence genre. In the following step —650, compatibility (matching) is performed of the layouts that were detected in the picture (for example—the horizontal lines) to a known pattern of this fence from this visual aspect. The following step 660 is the stage of preliminary study of the system, in which there are learned repeated and recurring warnings of mis-matching between the detected picture and known fence layouts (and with due consideration given to the imaging sensor's location) in order to prevent false warnings due to legitimist known disorders due to visual effects, for example—due to signs that are hanged on the fence, poles etc. that truncate (interrupt) the orderly (and expected) layout that characterizes the fence (for example—the cited horizontal lines of a taut wires type of fence). From the instant of accumulating information about legitimist "disorders" as said and comparing them to the specific warning about mismatch, there starts to operate stage 670 of issuing a true warning about detecting a rip in the fence that interrupted the regularity that characterizes the fence (for example—the cutting of the horizontal lines of the wires of a taut wires type of fence).

Algorithm 710 for locating a suspected object adjacent to the fence is based on construction a stereoscopic display. In the first stage there is executed (also in this case) a distortion correction 720 in which the pictures that are received from the "fish eye" lens that were produced from the imaging sensor (with the task of photographing an as large as possible sector of the near by fence, for example—an 120° sector of the near by (adjacent) fence surface that is located at a distance of 70 cm from the imaging sensor) are corrected as required for being processed. In the following stage 730, holographic calculation and correction is executed. Because in this example, the imaging sensor is not stabilized, the processing system finds the angular position of the imaging sensor in relation to the fence's surface (in the yaw, pitch and roll plains) and corrects the picture in accordance with the angular location. In the following step 740, the imaging processing system builds a three dimensional map using the stereoscopic method (two photos from two different angles), in the following stage 750, there is executed the stage of comparing the three dimensional map to an earlier scanning. The comparison is executed while taking into consideration the location of the imaging sensor (760) and matching each one of the pictures to a previous scanning that was tagged in accordance with its specific location (770). In the following stage 780, there might be issued an alarm signal after comparing the three dimensional map in which the new foreign object was detected to a tracking in time map (e.g.—gray level based compression) 790, in order to cancel false alarms due to a random entrance of a temporary object in motion (for example—a flying bird).

Thus, any professional would appreciate the fact that the proximity of the imaging sensors of the mobile payload in accordance with the invention to the surface plain of the fence and to the ground's surface adjacent to them, provide for the capabilities of accurate image processing, in a manner that it is liable to provide warnings relating to intrusions through the fence or the existence of threats in its vicinity. Rips in the fence, footprints on the pre-brushed soil route that stretched along the fence, a "stone" like roadside bomb that was put near the fence—all those and others are liable to be detected by a system in accordance with the invention.

A security system in accordance with the invention is liable to include several payload units that would be allocated, each one of them, to scanning a specific zone (for example—a sector of up to 500 meters length). In each one of the sectors, there would be installed alongside the rail track means, anchoring means, namely—base stations for anchoring from time the movable payload means. It is also possible and expedient to plan the deployment of the anchoring means with delegating partial overlaps between zones, in order to assure redundancy in the systems.

Means for anchoring the payload from time to time is liable to serve also for low voltage power supply source to the battery of the payload while it is anchored there, or for constantly (continually) supply for a system of supply cables that are deployed along the rail track and parallel to it or for supply to bus bars that consist a part of the track. The electricity supply is liable to reach the anchoring means over a cables (wires) network or being produced on the site (for example by solar cells). The anchoring means an also serve for relaying communications between the moveable payload and a remote control and command room (for example—concatenation cellular communication from the payload to a communication infrastructure based on fiber optics that is connected to the anchoring means). All this and more—anchoring means is amenable to serve as a station for periodic maintenance service chores of the payload. The connecting of the payload to the anchoring means would enable executing self-tests and sending reports of serviceability to a remote command room. Thus for example, in the anchoring means, it will be possible to check the serviceability of the mobile payload units such as the image sensors, the illuminating means and to execute a physical cleaning of the lenses of the payload (for example by rinsing).

Reference is made to FIG. 8. FIG. 8 constitutes a close view in perspective of a means 810 for occasional ("time to time") anchoring of the mobile payload in the security system that is illustrated in FIGS. 1 and 2.

Anchoring means 810 is positioned along track 22 and links the system to the electricity power supply and to remote command and control transmissions. The means comprises cleaning means 820 for cleaning of the payload imaging sensor lenses. Thus for example, from the instant of anchoring the payload system, sprinklers 822, 824 are set to operate for rinsing the payload unit. The electricity power supply 830 that is installed in the anchoring means feeds—as in the illustrated example, the electricity conductor 60 (see above, when referring to FIGS. 1 and 2). A wireless communications module 840 enables communication with the payload when it is moving, wherein a cables (wires) infrastructure 850 enables relaying the communication messages from the payload to a remote command and control room and vice versa (for example—by an optical fiber. From the instant that the payload anchored at the anchoring means, the communication is switched to line communication through switch 860.

Reference is made to FIGS. 9 to 12. FIG. 9 constitutes an illustration in perspective of an additional example 2010, of a fence coupled security system in accordance with the invention. FIG. 10 constitute a near view in perspective of a sector from the security system 2010 that is illustrated in FIG. 9. FIG. 11 constitutes a view in perspective of a mobile payload 2030 of security system 2010 that was illustrated in FIGS. 9 and 10. FIG. 12 constitutes an exploded view of several components of mobile payload 2030 that was illustrated in FIG. 11.

In system 2010 there is implemented another (and different) communication infrastructure that is liable to include a deployment of leaky feeder antenna 2012 in the form of a cable 2014 substantially parallel the rail track 2022. The wireless communication module that is installed on the mobile payload would then be required for receiving and transmitting in a relatively short range (for example approximately half a meter) wherein the transmissions from the payloads to it would be passed along the cable to the transmitting/receiving unit that would be located at the anchoring means (the base station) and from it. Any professional would understand that such a communication infrastructure is more difficult to be blocked and immune against disturbances.

Payload means 2030 constitutes an additional example of a mobile payload in a system in accordance with the invention (similar to payload 30 that was described above while referring to FIGS. 1 to 5, and it is similar to such an extent, that for avoiding excessive encumbrance we shall not present anew a detailed description herein of the equivalent payloads).

Three (3) imaging sensors are mounted in payload means 2030—three CCD cameras—2443 and 2444 as stationary sensors and 2446 (a PTZ camera capable of pan, tilt, and zoom movements not available to stationary cameras).

Linking (coupling) means 2066 bridges payload means 2030 to a couple of electricity cables 2062 and 2064 that are deployed along track 2022 in a manner that enables sliding on it while maintain the electricity contact (if and when the payload is operated in a mode of an external power supply).

The payload comprises chassis assembly 2320 on which there are mounted supporting wheels array 2310 (each formed in a cylindrical shape), propelling means (electric motor) 2340, belt based transmission 2344 and a pair of accelerating wheels 2330 and 2331 that are belted wheals propelled by the transmission.

Chassis assembly 2320 is formed with an opening 2322 in a manner that from the instant of mounting the mobile payload on track 2022, the track is found inside chassis assembly 2320.

An upper covering component 2324 is mounted on the chassis and serves as a basis for an imaging sensor 2446, for aerial (antenna) 2326 that serves for communicating with leaky feeder antenna 2012, and for antenna 2327 of an electronic countermeasure means (e.g.—means for blocking remotely send signals for detonating a roadside bombs).

Under the chassis assembly 2320 and wherein they are affixed to it using bracket component 2328, there are means that are remotely operated, such as audio means 2460 for public addressing through a speaker 2462 and listening through microphone 2464 as well as remotely firing (shooting) means—in the illustrated example—a remotely operated tear gas sprayer 2466.

An electronics packaging box 2350 is installed at the bottom section of the payload and connected, inter alia, to an antenna 2352.

A battery 2362 is installed under box 2350 and enables to operate the moveable payload in a mode of independent—inner, power supply. The self propelled payload comprises also an additional mounted battery (that is not illustrated) and that—as would be clarified later on, when we will be referring to FIGS. 13 to 17, serves for propelling the payload in a maintenance motion when it is staying in an anchoring means (for example in order to exchange battery 2362 that was discharged with an alternate fully charged battery). Battery 2362 is amenable to be unloaded from and installed on the payload in a robotic manner—mechanized and remotely operated, and about this, as said, we will provide below a detailed description (treating FIGS. 13 to 17).

Lower covering component 2340 completes the structure of the payload.

Reference is made to FIGS. 13 to 17. FIG. 13 constitutes a near view in perspective of means 2810 for anchoring from time to time mobile payload 2030 of security system 2010 that was illustrated in FIGS. 9 and 10. FIGS. 14 to 17 constitute near views in perspective of means 2810 for anchoring from time to time the mobile payload, wherein the illustrations show its various operating states—unloading battery 2362 of the mobile payload and its replacement with a new battery —2362'.

Means 2810 for anchoring from time to time the mobile self-propelled payload 2030 is positioned alongside the intrusion detection fence within (inside) a sheltered (armored) structure 2814 that is intended to conceal and protect the anchoring means and the mobile payload (when parked there) from the direction of the fence. Means 2810 comprises a couple of unloading and loading arrays 2816 and 2818 for unloading the battery from the mobile payload and loading it with a new one. The arrays are positioned one next to the other in tandem in a manner that they enable simultaneous anchoring of two payloads one near the other and treating (handling) them in one anchoring means (but any professional would understand that we are discussing solely an example and two such neighboring payloads can be allocated to an anchoring means equipped with only a single unloading and loading array, in a manner that provide for the intermittently maintenance of two neighboring payloads—one at a time).

In the illustrated example, each one of the unloading and loading array includes a pair of mobile actuators that are positioned one next to the other in tandem (2822 and 2824 that are attributed to array 2816 and 2826 and 2828 that are allocated to array 2818). The actuators are moving in a linear movement upwards and downwards towards the payload that positions itself on them and then distancing themselves from it (see the directions of the arrows in FIGS. 14 and 17). The actuators might be based on a pneumatic piston or hydraulic one, or any other linear propelling system. At the top of each actuator there is mounted a tray 2832 that is suited to positioning the battery on it. Any professional would understand that the arrays include also means for unloading the batteries from the trays and for positioning other instead of them (means that are not illustrated).

Battery 2362 is formed with a number of assemblies for connecting to the payload and cutting themself away from it, that are equipped with remote electro-mechanic operation capabilities. See in the illustrated example of the battery in FIG. 14—two pins assemblies 2834 and 2836 that are formed on the battery proper and are suited to be stuck in matching electrical sockets (that are not illustrated) that are formed in the bottom of the payload. Unto each of the pins assemblies there is matched an electro-mechanical locking mechanism (that is not illustrated) that is mounted alongside the suiting socket at the bottom of the payload and that—on its actuation, propels for example a locking reed (tab) that gets engaged into a fitting socket that is formed on the circumference of the pin, and therefore providing for the on command, locking of the battery into the payload and unlocking it. An example to such an electro-mechanical locking mechanism might be a solenoid that is remotely actuated to propel as said, a locking reed (tab) to a connected state with the pin or to distancing itself from it.

The method that is implemented for unloading the empty battery and exchanging it with a new one comprises several stages. In the first stage, from the entrance of the self-propelled payload into the anchoring means (see FIG. 14) it positions itself above the first actuator in the array (in the illustrated example—payload 2030 positioned above actuator 2822). In the next stage the actuator is propelled into linear motion towards the bottom part of the payload until the poisoning of tray component 2832 under the payload battery. In the next step there are actuated, as said, the electro-mechanical locking mechanisms for cutting off the battery from its anchoring in the payload. In the next stage (see FIG. 15), from the instant that the battery is laid on the tray component, the actuator is propelled unto linear motion in the downwards direction and distances the empty battery from the payload. In the next stage, (see FIG. 16), the payload is propelled into a short motion along the track within the confinement of the anchoring means (for example using an internal battery), and gets positioned above the second actuator in the array (in the illustrated example, payload 2030 is positioned above actuator 2824). In the next stage (see FIG. 17), the actuator is propelled unto linear motion towards the bottom part of the payload, up to positioning tray component 2832 that carries on it a "new" battery 2362' under the payload and integrating the pins assemblies in the matching sockets that are formed as said, in the bottom section of the payload. In the next stage the electro-mechanical locking mechanisms for affixing the battery and anchoring it in the payload are operated. In the next step, the final one, from the instant that the battery was affixed to the payload, the actuator is propelled into a linear motion downwards and the self-propelled payload is ready to return and be propelled in a linear motion along the track while utilizing a fresh battery.

The embodiments described hereinabove while referring to the accompanying figures, although provide for the quick (speedy) location of imaging sensors and means for remote operation capabilities are not without limitations. It is to be remembered that the payload described in those above mentioned configurations is left—finally—on a given track, in a manner that limits the line of sight of the sensors and the arena of operation (activity) of the means being used. All this and more, the real time capability to analyze the processed images that are received from the image sensor (for example—CCD) that is mounted in the payload—as is needed for example to detect a torn area (piece) in the fence, or traces (impressions) that were "stamped" in the "blotting" ("blurring") path near to it, posting a ladder or a side charge (armament) near to it are limited, and hence an advanced three dimensional mapping capability is needed in the vicinity of the payload.

Reference is given to FIGS. 18 and 19. FIG. 18 constitutes an illustration in perspective of a security system 3810 that comprises a payload 3830 propelled on a track 20 in accordance with the invention. Payload 3830 comprises a bi-dimensional laser means 3840 for the sake of a tri-dimensional mapping of the vicinity of the payload while the payload is moving (travelling) on the track. FIG. 19 constitutes an illustration of the mode of scanning done by laser means 3840.

Laser means 3840 constitutes a double sided (bi-sided) laser radar (LIDAR) that exploits the movement of payload 3830 along track 20 to serve as the third axis. If we assume that the motion alongside the track is along the X axis, the height dimension of the payload from the ground surface defines the Y axis and the dimension in the direction that is perpendicular (orthogonal) to the track constitutes axis Z, then payload 3830 moves in the X direction and scans in the Z, Y plane. The scanning is executed in a configuration of forming circles at a high rate (for example—in every second there are executed 25 complete scanning circles in the Z, Y planes). Through this manner, helix-like scanning is provided wherein the helix pitch spaces are depended on the speed of the motion of payload 3830 along track 20. Each rotational cross section that is generated by the laser scanning is translated to coordinates Z, Y and receives a value in accordance with the value of the X in the beginning of each turn. Using this method, it is feasible to obtain a file of the ensuing reflected (returned) data of the laser beam from all the points in the neighborhood of the payload (at the X, Y, Z ordinates). The collection of the data enables producing a high resolution three dimensional display of the area in the vicinity of the payload that is located in the line of sight of the rotating laser radar 3840. Any professional would understand that these data enables executing image processing whether it is on board payload 3830 or at a distanced (remote) control and command center into which the data can be transmitted from the payload for locating irregular (unusual) visual aspects that indicate (point at) penetration or other hostile activity (for example—locating a rip/rift in the fence that did not exist earlier, a ladder that was posted (erected) adjacent to the fence just recently, feet steps that were added (that were "stamped" in the "blotting" ("blurring") path near to the fence), a foreign body that was added to the picture of the familiar scenery that might be a hostile side charge (explosive) and similar phenomena.

Reference is given to FIG. 20. FIG. 20 constitutes an illustration in perspective of propelled payload 3130 on a track in accordance with the invention in which there were installed, in addition, an un-manned flying vehicle 3150 that is given to be launched from payload 3130 and an un-manned vehicle 3160 that is given to be dropped to the ground from payload 3130.

Flying vehicle 3150 constitutes, in accordance with the illustrated example, an hovering means with capability to take off and land vertically (for our needs—taking off from payload 3130 and also returning to land on it), namely—a kind of a mini unmanned tiny helicopter. Vehicle 3160 in accordance with the illustrated example, is a tracked vehicle that from the instant of arriving on the ground surface it is given to be started quickly on it.

Any professional would understand that these means—the flying means and the vehicle means widens immensely (without bounds) the detection and reaction (response) capability of payload 3130, and this beyond the zone of the fence that is adjacent to track 20 on which it is usually propelled—up to a range that is apt to be hundreds of meters and even kilometers from a given location of the payload along the track and while providing for additional sight angles and operations (for example—by installing imaging sensors on the flying means and vehicle means, or even remotely controlled operated firing means).

Reference is given to FIGS. 21 to 23. FIG. 21 constitutes an illustration in perspective of an added configuration of a system 3210 in accordance with the invention. System 3210 comprises a payload 3230 propelled over track 20 and in addition also a wagon 3235 that is towed by the payload and wherein on it there are mounted an unmanned flying means 3250 that can be launched and landed from over wagon 3235 that is towed over the track and an unmanned vehicle 3260 that is given to be dropped unto the ground from wagon 3235. FIG. 22 constitutes an illustration in perspective of wagon 3235. FIG. 23 constitutes an exploded view of the components of wagon 3235.

Also in this example, flying means 3250 is a hovering means as cited above with the capability to take off vertically from wagon 3235 and to land back on it. Vehicle means 3260 constitutes, in accordance with the illustrated example, a tracked vehicle that from the instant of arriving on the ground (after being dropped) it can be started there swiftly.

In accordance with this configuration, dedicated wagon 3235 is connected to payload 3230 and is towed or pushed by it (i. e.—the wagon does not include self-propelling means but relies on the payload's propelling). Wagon 3235 serves as a taking off and landing platform for the hovering/flying means 3250 as well as a dropping post for the unmanned vehicle means 3260. The wagon can also include units with electricity supply for charging the batteries of the hovering means and of the unmanned vehicle (before being dropped to the ground). Concurrently, the wagon can receive power supply (electricity) feeding from payload 3230. The wagon might also include communication transmission means and thus serve as a relay station for a communication between a remote command and control center and the tiny hovering means and the vehicle means.

Hovering means 3250 is liable to be anchored to wagon 3235 through an electro-mechanical connection assemblage. In the illustrated example—a conic socket 3252 is formed at the bottom of hovering means 3250 and suited to form a connection with a matching conic base 3254 that is installed on body assembly 3237 of wagon means 3235. A solenoid component 3256 anchors the hovering means to the base and is given to be opened by a remote control command (trigger) as is necessary before the hovering means takes off from the wagon.

Unmanned vehicle 3260 is usually stowed inside cabin 3239 that is formed in body assembly 3237 of wagon 3235. From the instant that it is required to execute a chase or to arrive at a faraway (distanced) post from track 20 on which there are moving the payload and the wagon, a solenoid component 3241 is given to be actuated by a remotely issued command for opening as required door 3243 and dropping vehicle means 3260 to the ground (from the instant that the chase is terminated or landing at a distanced observation post, the vehicle would be manually retrieved back to the wagon).

Reference is made to FIG. 24. FIG. 24 constitutes an illustration in perspective of an additional configuration of a system 3310 in accordance with the invention. System 3310 comprises a propelled payload means 3330 propelled on track 3320, and in addition also a wagon 3335 that is towed by it and wherein on it there is mounted an un-manned flying means that is given to be launched from (over) the wagon.

Reference is made to FIG. 25. FIG. 25 constitutes an illustration in perspective of an additional configuration of a system 3410 in accordance with the invention. System 3410 comprises a propelled payload means 3430 propelled on track 3420, and in addition also a wagon that is towed by it and wherein on it there is mounted an un-manned vehicle means 3450 that is given to be dropped to the ground surface from the wagon.

Any professional would appreciate the fact that a system in accordance with this patent application implements means that are each known and recognized per-se, such as—bi dimensional laser radar (LIDAR) for high resolution mapping of spatial picture, a small (tiny) unmanned airplane means and an unmanned vehicular means—and integrates them all in a security system that is based on a payload which is propelled on a fence adjacent track.

Thus, as per considering the description given above and the accompanying figures, any professional would understand that a system in accordance with the invention instills improved capabilities to the quick (speedy) emplacement ability of imaging sensors and remotely operated means as they were described for example hereinabove while referring to FIGS. 1-17. A system in accordance with the invention overcomes the operational rigidity that embodies the configuration of the propelled payload that is described in those embodiments (as a result of the fact that it is propelled on a fixed track, in a manner that it limits the line of sight and the operational arena of the means that are mounted on it). All this and more—a system in accordance with the invention instills preferable capability of real time analyzing from the visual point of view, of the neighborhood (vicinity) of the propelled payload.

Thus, a fence's linked security system in accordance with the invention is liable to instill continuous scanning capability along the intrusion detection fence line and at its vicinity while concurrently continuously processing the view of the fence and its immediate vicinity as it was observed from nearby, for automatic detection and/or by remote observation (from a distant control center) of a rip in the fence, damage to the fence, foot marks that were impressed near it or foreign objects (for example—roadside bombs) that were laid near to it. In addition to the continuous and routine scanning capability, a security system in accordance with the invention is liable to be enslaved to warnings as they are received from the intrusion detection fence. The mobile payload of the system is liable to be launched unto moving and quick arrival to the sector or specific site along the intrusion detection fence from which the suspecting indication was received, for local visual scanning from near-by, while transforming the information by transmission it far away (to a remote control center) and activating various means that are viable to be mounted on it (in addition to the imaging sensor means). The linear—serial structure of the system wherein it is coupled adjacent to the fence, enable installing several payloads that are in charge— regularly, each of them, on scanning a selected and different fence zone, wherein when necessary (for example from the instant of receiving the warning) the payloads are propelled to move, all of them or parts thereof, towards one sector of the fence, and enable concentration of imaging sensors and additional means (as they are installed on the payloads) in this sector.

While the above description contains many specifications, the professional reader should not construe these as limitations on the scope of the security system which is the subject matter of the invention, but merely examples of embodiments thereof. It will be apparent to those skilled in the art of designing and manufacturing security system that various modification and variations can be made in the security system of the present invention without departing from the spirit or scope of the invention. Thus, it is intended that the present invention covers modifications and variations that come under the scope of the following claims and their equivalents.

What is claimed is:

1. A self-propelled security system on an adjacent-to-a-fence track that comprises:
   a rail track means that extends at a height above the ground surface, along the fence and substantially parallel to the fence;
   a payload means that is connected to the rail track means wherein the payload means is suited to move along the length of the rail track means and comprises at least one imaging sensor, that from the instant of installing the payload means on the rail track means, the payload means is turned towards the fence; and
   at least one anchoring means for anchoring, from time to time, the payload means, and wherein the anchoring means is located along the track's length, providing the security system with an electricity power supply, and connecting the security system to a remote command and control transmissions site; and
   wherein the rail track means comprises an exposed track that is anchored to the fence poles, protrudes from the fence poles and is located at a distance from the surface plain of the fence that is connected to the fence's poles and parallel to the fence's surface plain;
   wherein the payload means is autonomic in its movements over the exposed track and also is exposed to the fence; and
   wherein the payload means comprises a battery that is amenable to be affixed and cutoff from the payload means, and the anchoring means includes an array for replacing the battery with a new one by unloading the battery from the payload means and loading a new battery to the payload means.

2. A security system in accordance with claim 1, wherein:
   said fence constitutes an intrusion detection system equipped with an array of poles that are stuck in the ground along its length; and
   wherein the system comprises in addition:
   supporting means for linking said track to already existing poles of said fence and for providing support to said rail track.

3. A security system in accordance with claim 1, wherein said system comprises in addition:
   marking means that are located along said track means and from an instant that said payload means passes by—they enable reading information that is found on them by a reader means that is installed on said payload means.

4. A security system in accordance with claim 1, wherein:
   said array for unloading said battery from said payload and replacing it with a new one comprises a pair of actuators that are positioned one next to the other in tandem and are mobile in a linear motion upwards towards said payload that gets positioned above them and by distancing itself away from it, and wherein:
   said array implements in its operation for replacing a battery in said payload a method that includes the stages of:
   a. positioning said payload above the first actuator in the array; and
   b. propelling said first actuator into a linear movement towards a bottom part of said payload until positioning a tray component that is formed on it under said battery; and
   c. activating electro-mechanical locking mechanisms for cutting off the battery from its anchoring in the payload and laying it on said tray component; and
   d. propelling said actuator into a downwards motion and distancing said empty battery from the payload; and
   e. propelling said payload for a short movement over the track and positioning it over the second actuator on said array; and
   f. propelling said second actuator into a linear motion towards said bottom part of the payload, until a tray component that is formed on its upper surface and that carries a new battery on it will be positioned under said payload; and
   g. actuating said electro-mechanical locking mechanisms for affixing and anchoring said battery unto the payload; and
   h. propelling said second actuator into a downwards linear motion and leaving said payload ready to return and be propelled for motion along the track.

5. A security system in accordance with claim 1, wherein said system comprises in addition:
   an electricity conducting means spread along the track in parallel to it and suited to being connected with said payload means for supplying electric power to it.

6. A security system in accordance with claim 1, wherein said system comprises in addition:
   an image processing system for processing images received from said imaging sensor for automatic localization of defined images that are categorized as providing indication of intrusion through the fence or of other threats.

7. A security system in accordance with claim 1 wherein said payload means comprises:

a supporting wheels array meant to be linked to said exposed track; and at least one accelerating wheel means that is also suited to be installed unto said exposed track and propel said payload means to move along its length; and a propelling means that is connected to said accelerating wheel in order to propel it to moving; and a reading means that enables reading information from said marking mans that are located along said rail track; and speed and road sensors; and a control assembly that is linked to said propelling unit, reading means and speed and road sensors; and;

a router means that is connected to said control assembly, as well as to said imaging sensor, and to a GPS based location sensor and to wireless communication module; and a battery for supplying electrical power to said payload means and assemblies that need electrical power, and is linked to a charging and switching controller; and means for charging said battery.

8. A security system in accordance with claim 1, wherein said payload means comprises in addition:

at least one remotely operated means chosen from a group of means that includes—audio means for announcing and/or listening, firing means, a non lethal weapon means, illumination means and electronic countermeasure means.

9. A security system in accordance with claim 1, wherein said system comprises in addition:

communication infrastructure that includes a leaky feeder antenna in the form of a cable deployed substantially parallel to said rail track.

10. A security system in accordance with claim 1, wherein said system comprises in addition:

an image processing system for processing images received from said imaging sensor for automatic localization of defined images that are categorized as providing indication of intrusion through the fence or of other threats; and the system is characterized by that:

said payload means comprises at least one means from the following group of means— a. bi-dimensional laser radar means (LIRAD) for a tri-dimensional mapping of the neighborhood (vicinity) of said payload means during the movement of said payload on the track; and b. an unmanned flying means that is given to be launched from over said payload means; and c. an unmanned vehicle means that is given to be dropped to the ground surface from the payload means.

11. A security system in accordance with claim 10, wherein:

the security system comprises, in addition, a wagon that is towed or pushed by said propelled payload along said track, and at least one of two means, namely said unmanned flying means and said unmanned vehicle means, are mounted on said wagon.

* * * * *